(12) United States Patent
Fusz et al.

(10) Patent No.: US 7,133,835 B1
(45) Date of Patent: Nov. 7, 2006

(54) ONLINE EXCHANGE MARKET SYSTEM WITH A BUYER AUCTION AND A SELLER AUCTION

(75) Inventors: Eugene August Fusz, St. Louis, MO (US); Christopher Ames Kline, St. Louis, MO (US)

(73) Assignee: CXN, Inc., St. Louis, MO (US)

( * ) Notice: Subject to any disclaimer, the term of this patent is extended or adjusted under 35 U.S.C. 154(b) by 1023 days.

(21) Appl. No.: 08/550,455

(22) Filed: Oct. 30, 1995

Related U.S. Application Data

(63) Continuation-in-part of application No. 08/512,365, filed on Aug. 8, 1995, now abandoned.

(51) Int. Cl.
*G06Q 30/00* (2006.01)
(52) U.S. Cl. .......................................... 705/26; 705/37
(58) Field of Classification Search ................ 395/326; 705/20, 26, 27
See application file for complete search history.

(56) References Cited

U.S. PATENT DOCUMENTS

| | | | |
|---|---|---|---|
| 3,573,747 A | 4/1971 | Adams et al. | |
| 3,581,072 A | 5/1971 | Nymeyer | |
| 4,247,759 A | 1/1981 | Yuris et al. | |
| 4,412,287 A | 10/1983 | Braddock, III | |
| 4,449,186 A | 5/1984 | Kelly et al. | |
| 4,553,222 A | 11/1985 | Kurland et al. | |
| 4,677,552 A | 6/1987 | Sibley, Jr. | |
| 4,751,728 A | 6/1988 | Treat | |
| 4,763,356 A | 8/1988 | Day, Jr. et al. | |
| 4,789,928 A | 12/1988 | Fujisaki | |
| 4,799,156 A | 1/1989 | Shavit et al. | |
| 4,862,357 A | 8/1989 | Ahlstrom et al. | |
| 4,868,736 A | 9/1989 | Walker | |
| 4,903,201 A | 2/1990 | Wagner | |
| 4,931,932 A | 6/1990 | Dalnekoff et al. | |
| 4,992,940 A | * 2/1991 | Dworkin | |
| 5,021,953 A | 6/1991 | Webber et al. | |
| 5,077,665 A | 12/1991 | Silverman et al. | |
| 5,136,501 A | 8/1992 | Silverman et al. | |
| 5,168,446 A | 12/1992 | Wiseman | |
| 5,191,523 A | 3/1993 | Whitesage | |
| 5,191,613 A | 3/1993 | Graziano et al. | |
| 5,224,034 A | 6/1993 | Katz et al. | |
| 5,237,499 A | 8/1993 | Garback | |
| 5,243,515 A | 9/1993 | Lee | |
| 5,253,165 A | 10/1993 | Leiseca et al. | |

(Continued)

FOREIGN PATENT DOCUMENTS

WO        96/34356        10/1996

(Continued)

OTHER PUBLICATIONS

Dialog System Seminar I: The Basics, Dialog Information Servicer, 1989, Appendix d.*

(Continued)

*Primary Examiner*—Frantzy Poinvil
(74) *Attorney, Agent, or Firm*—Armstrong Teasdale LLP

(57) ABSTRACT

An exchange system for facilitating the purchase of products is described. The system is coupled, in one embodiment, to a communications link. Potential product purchasers and sellers may access the exchange system via the network, and submit offers and/or pricing requests to such system. In response to the requests, the system processor retrieves the stored data from the respective databases, and causes such data to be transmitted to the local site for display. The exchange systems also executes certain functions in response to commands and data transmitted from buyer sites, seller sites and institution sites.

65 Claims, 12 Drawing Sheets

U.S. PATENT DOCUMENTS

| | | | |
|---|---|---|---|
| 5,262,941 A | 11/1993 | Saladin et al. | |
| 5,283,731 A | 2/1994 | Lalonde et al. | |
| 5,297,031 A | 3/1994 | Gutterman et al. | |
| 5,329,589 A | 7/1994 | Fraser et al. | |
| 5,331,546 A | 7/1994 | Webber et al. | |
| 5,339,239 A | 8/1994 | Manabe et al. | |
| 5,361,199 A | 11/1994 | Shoquist et al. | |
| 5,377,097 A | 12/1994 | Fuyama et al. | |
| 5,404,291 A | 4/1995 | Kerr et al. | |
| 5,420,914 A | 5/1995 | Blumhardt | |
| 5,426,281 A | 6/1995 | Abecassis | |
| 5,444,630 A | 8/1995 | Dlugos | |
| 5,467,269 A | 11/1995 | Flaten | |
| 5,500,793 A | 3/1996 | Deming, Jr. et al. | |
| 5,517,555 A | 5/1996 | Amadon et al. | |
| 5,519,769 A | 5/1996 | Weinberger et al. | |
| 5,553,131 A | 9/1996 | Minervino, Jr. et al. | |
| 5,557,517 A | 9/1996 | Daughterty, III | |
| 5,557,518 A | 9/1996 | Rosen | |
| 5,570,283 A | 10/1996 | Shoolery et al. | |
| 5,592,375 A | 1/1997 | Salmon et al. | |
| 5,606,602 A | 2/1997 | Johnson et al. | |
| 5,611,052 A | 3/1997 | Dykstra et al. | |
| 5,615,269 A | 3/1997 | Micali | |
| 5,664,115 A | 9/1997 | Fraser | |
| 5,689,652 A * | 11/1997 | Lupien et al. | 705/37 |
| 5,694,551 A | 12/1997 | Doyle et al. | |
| 5,696,965 A | 12/1997 | Dedrick | |
| 5,710,877 A | 1/1998 | Marimont et al. | |
| 5,715,402 A | 2/1998 | Popolo | |
| 5,717,989 A | 2/1998 | Tozzoli et al. | |
| 5,732,400 A | 3/1998 | Mandler et al. | |
| 5,745,882 A | 4/1998 | Bixler et al. | |
| 5,757,917 A | 5/1998 | Rose et al. | |
| 5,758,328 A | 5/1998 | Giovannoli | |
| 5,774,883 A | 6/1998 | Andersen et al. | |
| 5,794,207 A | 8/1998 | Walker et al. | |
| 5,794,219 A | 8/1998 | Brown | |
| 5,797,127 A | 8/1998 | Walker et al. | |
| 5,799,285 A | 8/1998 | Klingman | |
| 5,809,478 A | 9/1998 | Greco et al. | |
| 5,818,914 A | 10/1998 | Fujisaki | |
| 5,826,244 A | 10/1998 | Huberman | |
| 5,832,452 A | 11/1998 | Schneider et al. | |
| 5,835,896 A | 11/1998 | Fisher et al. | |
| 5,845,265 A | 12/1998 | Woolston | |
| 5,878,141 A | 3/1999 | Daly et al. | |
| 5,878,403 A | 3/1999 | DeFrancesco et al. | |
| 6,085,176 A | 7/2000 | Woolston | |
| 6,202,051 B1 | 3/2001 | Woolston | |
| 6,266,651 B1 | 7/2001 | Woolston | |

FOREIGN PATENT DOCUMENTS

| | | |
|---|---|---|
| WO | 97/16797 | 5/1997 |
| WO | 97/46961 | 12/1997 |

OTHER PUBLICATIONS

Announcing Dialorder Version 2!!, Dialog Chronolog, Oct. 1986.*
"Dialog System Seminar I: The Basics", Dialog Information Systems, Inc., 1989.*
"Times Mirror Affiliate Launches First PC Travel Planning System for Corporate Use", American Database Corporation, Aug. 18, 1987.*
"Announcing Dialorder Version 2", Dialog Information Systems, Inc., Oct. 1986.*
"Sold!. . . To The Lowest Bidder", Computer Finance, v6, n2, PN/A, Jul. 1995, Dialog File 636, Accession No. 02778780.*
Promotional literature on DISC dealerNet.
"An Electronic Bridge To Customers," Informationweek, Jan. 16, 1995, pp. 38-39.
"Net Returns," by John Wolcott, Horizon Air Magazine, Nov. 1994, pp. 18-19.
"Virtual Showroom," unknown source.
Special Advertising Section, Inc., Jan. 1995.
Fishkin, Ken, Foresight Exchange Tutorial: (http://www.ideosphere.com/fx/docs/tutorial.html) Feb. 19, 1999 at p. 1-5.
"Bid.com 1998 Third-Quarter Revenue Increases 12.5 Percent From Second Quarter", Business Wire, Oct. 29, 1998.
Final Report: Virtual Hospital (http://www.telemed.medadmin.uiowa.edu/TRCDocs/Pubs/FinalReport/cVirtualH/virtualH/virtualh02.html), download date: Sep. 20, 1998.
"First Source Become a Member", More Reasons To Join First Source! (http://www.fsource.com/bene.html), download date: Sep. 20, 1998.
Jeffrey Davis, "Big Storm Rising", Business 2.0, Sep. 1998 at p. 60.
Suite 101.com (http://www.suite101.com/doc.cfm.presskit/questions), 1998.
LANCORP Mortgage Services, http://www.lancorp-mortgage.com/retailpa.htm, 1998.
Inland Mortgage Corporation, http://inlandmortgage.com/index.htm, 1998.
The Mortgage Store, http://www.mortgagestore.com, 1998.
Web Marketing Today (http://www.wilsonweb.com/rfwilson/wmt2/issue36htm) dated Sep. 1, 1997, download date: Sep. 17, 1998.
"Free Stuff Internet Site Delivers for Viewers and Advertisers Alike", Press Release of PromoNet Interactive, Inc. dated Nov. 10, 1997.
Moran, Susan, "Xerox Won't Duplicate Past Errors", Business Week, Sep. 29, 1997.
About Iao, selected pages downloaded from www.iaoauction.com on Sep. 8, 1997 and Sep. 18, 1997.
Onsale: Auction Supersite, selected pages downloaded from www.onsale.com on Sep. 8, 1997.
Hapgood, Fred bidder Harvest, Sep. 1997, p. 58.
Coleman, Zach, "Electronic Trading System Matches Buyers, Seller", Atlanta Business Chronicle, vol. 20; No. 12; 37A, Aug. 22, 1997.
NASDAQ: What is NASDAQ?, selected pages downloaded from http://home.axford.com on Aug. 15, 1997.
NASDAQ Consolidated Subscriber Agreement, downloaded from www.pcquote.com/exchanges on Aug. 15, 1997.
TradingFloor: General Trading Information and Terms, downloaded from www.tradingfloor.com on Aug. 15, 1997.
HomeShark: Refinance Check, selected pages downloaded from www.homeshark.com on Aug. 13, 1997.
The Loan Process, downloaded form www.sdtech.com/mls/process on Aug. 7, 1997.
Trade-Direct: We Help You Trade With Confidence, selected pages downloaded from www.trade-direct.com on Aug. 6, 1997.
Classifieds2000: The Internet Classifieds, selected pages downloaded from www.classifieds2000.com on Aug. 6, 1997.
Internet Mortgage Service Eliminates Loan Agents and Passes Commissions on to the Consumer, Company Press Release, Yahoo Business Wire (Jun. 30, 1997).
Frequently Asked Questions About: Airhitch, selected pages downloaded from www.isicom.com.fr/airhitch on May 6, 1997.
Hitch a Flight to Europe, selected pages downloaded from www.travelassist.com on May 6, 1997.
Airhitch: Your Way to Low Cost Travel, selected pages downloaded from www.vaportrails.com on May 6, 1997.
Kelsey, J. and Schneier, B., Conditional Purchase Orders, 4th ACM Conference on Computer and Communications Security, ACM Press, 117-124 (Apr. 1997).
Bryant, Adam, "Shaking Up Air Fares' Status Quo", The New York Times, Mar. 31, 1997.
Silverman, Robert, "GM Drives Wed Ad Insertion Network", Inside Media, Feb. 26, 1997, vol. 9, No. 4, p. 1: ISSN: 1046-5316.
"Flycast Introduces Unique 'Open Exchange' Match-Making Service", Interactive Marketing News, Feb. 21, 1997, vol. 4, No. 8.
"UK's" World Telecom Unveils New WorldSaver Tariffs, Newsbytes, Information Access Company (Feb. 13, 1997).
Golden Age Antiques and Collectibles Online Auction, http://www.goldage.com, 1997.

Resnick, Paul et al, "Roles For Electronic Brokers", http://ccs.mit.edu/CCSWP179.htm 1997.
Philatelists Online Information, http://www506.bonsai.com/g@131354lhyljf/infop.html, 1997.
Sports trade Information, http://www.sportstrade.com/infos.html, 1997.
Numismatists Online Information, http://www.numismatists.com/info.html, 1997.
Sell and Trade Internet Marketplace, Sell and Trade, http://sellandtrade.com/script/main.asp, 1997.
Kay, Alan, "Chapter 7 Future Research", 1997.
Negroponte, Nicholas, "Pay Whom Per What When, Part 2", NEGROPONTE, Issue 5.03, 1997.
"TransQuest and Web Ventures Deliver Internet Booking for Delta Air Lines", PR Newswire, Dec. 3, 1996, Financial News Section.
"Affinicast Enables Web Sites That Listen and Adapt to Customer Affinities", PR Newswire, Dec. 3, 1996.
"Web Ventures Presents BookIt!" press release printed from http://www/webventures.com/bookit/(Web Ventures World Wide Web site) on Dec. 2, 1996.
"World's First Real-Time Travel Auction Service to Be Available Via World Wide Web: ETA To Open Bidding to Consumers," Business Wire, DIALOG Trade & Industry Database (Nov. 4, 1996).
Gessel, Chris, "Trade Smarter: The Limit of Orders", Investor's Business Daily, Oct. 14, 1996, p. A1.
CREST: Cruise/Ferry Revenue Management System, selected pages downloaded from www.rtscorp.com on Aug. 5, 1996.
Nishimoto, Lisa, "Travel Services Are First Online Commerce Offerings to Fly," Infoworld, Jul. 29, 1996, downloaded from http://www.infoworld.com.
About Rate Hunter, downloaded from http://207.49.64.77/rhprodrh.htm on Jul. 14, 1996.
Cathay Pacific Online Ticket Bidding, World Internet News Digest (May 8, 1996).
Sothbey's General Information, downloaded from www.sothebys.com (1996).
CyberBid, Net Fun Ltd.(1996).
Nimmer, Raymond, T., "Electronic Contracting; Legal Issues", 14 J. Marshall J.Computer & Info L.211, Winter, 1996.
American Law Institute, Draft-Uniform Commercial Code Revised Article 2 (Sales), parts 2, 3, and 7, pp. 1-15, Jan. 4, 1996.
"Ticketing revolution Could Triple Airline Profits, Analyst Says", Aviation Daily, vol. 325; No. 11; p. 87, 1996.
"Auctioning Unsold Airline Tickets", adapted extract from Insight (USA), The Global Ideas Bank, 1996.
Rockoff, Todd E., et al., "Design of an Internet-based system for remote Dutch auctions," Internet Research: Electronic Networking Applications and Policy, vol. 5, No. 4, pp. 10-16, 1995.
Franklin, Matthew K., et al., "The Design and Implementation of a Secure Auction Service," Proceedings: 1995 IEEE Symposium on Security and Privacy, pp. 2-14, 1995.
Tenenbaum, Jay M., et al., "CommerceNet: Spontaneous Electronic Commerce on the Internet," 1995 IEEE Spring Conference, pp. 38-43.
Sirbu, Marvin and Tygar, J.D., "NetBill: An Internet Commerce System Optimized for Network Delivered Services," IEEE 1995 Spring Conference, pp. 20-25.
Bunker, Ted, "How Auction Technology Sped And Enhanced Sale Of Radio Licenses," Investor's Business Daily, Executive Update, Regulation, p. A3, Feb. 24, 1995.
"AUCNET: The Story Continues", Harvard Business School, Jan. 17, 1995.
Anand, R., and Rao, M. Padmaja, "The Electronic Flea Market", IBM Research Division: Research Report, pp. 1-18, Jul. 28, 1994.
"Unusual Farmland Auction Set," Harrison Scott Publications, Liquidation Alert, Mar. 28, 1994.
"The Computer Museum brings auction block to cyberspace in First Internet Auction," Business Wire, Mar. 14, 1994.
Freeman, Brian and Gideon, Lidor, "Hosting Services—Linking the Information Warehouse To the Information Consumer," IEEE 1994 Spring Conference, pp. 165-171.

Speidel, Richard E. & Schott, Lee A., "Impact of Electronic Contracting on Contract Formation Under Revised UCC Article 2, Sales",C878 ALI-ABA 335, Dec. 9, 1993.
Booker, Ellis, "Mega real estate auction counts on imaging," Computerworld, p. 20, Dec. 7, 1992.
Abstract: "A forward/reverse auction algorithm for asymmetric assignment problems," Computatiional Optimization and Applications, Dec. 1992.
Hainer, Cathy and Grossman,Cathy Lynn, "Where Vacationing Kids Get Good Care", USA Today, Apr. 1, 1992, at p. 4D.
Abstract: "Marketel Shuts Doors," Travel Agent Magazine, Mar. 23, 1992.
Del Russo, Laura, "Ticket-Bidding Firm Closes Its Door," Travel Weekly, Mar. 12, 1992.
"Newsletters", The Atlanta Constitution, Mar. 1, 1992, p. K13.
"CRTL's Blue Ribbon Deals for 1992", Consumer Reports Travel Letter, Jan. 1992, vol. 8, No. 1, at pp. 3-5.
Traveler's Notes; Bookit Report, Consumer Reports Travel Letter, Dec. 1991 at p. 143.
Feldman, Joan M., "To Rein In Those CRSs; Computer Reservation Systems", Air Transport World, Dec. 1991, at p. 89.
"Money Briefs; Buy Low, Fly High", Gannet News Service, Nov. 20, 1991.
"Buy Low, Fly High", USA Today, Nov. 14, 1991 at p. 15.
Traveler's Notes; Easier Airfare Bidding, Consumer Reports Travel Letter, Oct. 1991 at p. 119.
Nelson, Janet "Practical Traveler; Airlines Relaxing Policy on No-Refund Tickets", The New York Times, Sep. 22, 1991 at p. 3 of Section 5.
Pelline, Jeff, "New Service; Now You Can Make a Bid on Your Next Airline Ticket Home", The Orange County Register, Sep. 1, 1991 at p. E01.
"Bookit Airfare Bidding System (Fax for Your Plane Ticket?)", Consumer Reports Travel Letter, Sep. 1991, pp. 97 & 106.
Cass, Maxine, "West Coast Agents Remain Skeptical About New Air Ticket Sales Plan; Marketel: Airline ticket sales system sparks concern," Travel Agent Magazine, p. 50, Sep. 2, 1991.
Upton, Kim "French Say Monoliths Off-limits to Visitors", Los Angeles Times, Aug. 25, 1991.
Pelline, Jeff, "Travelers Bidding on Airline Tickets; SF Firm Offers Chance for Cut-Rate Fares", San Francisco Chronicle, Section A4, Aug. 19, 1991.
Carey, Christopher, "Firm Offers Auction For Airline Tickets", St. Louis Post-Dispatch, Aug. 7, 1991 at p. 1B.
Del Rosso, Laura, "Marketel Says It Plans to Launch Air Fare 'Auction' in Jun.", Travel Weekly, Apr. 29, 1991.
Bookit!, "Airline Ticket Purchase Order For Business & Leisure Travel", Marketel International, Inc., 1991.
NASDAQ Adds Enhancements to SOES Limit Order File, Securities Week, Nov. 26, 1990, p. 5.
Inhaber, Herbert, "How To Solve the Problem of Siting Nuclear Waste," Transactions of the American Nuclear Society, vol. 62, Nov. 11-15, 1990.
Dyson, Esther, "Information, Bid and Asked," Forbes, Aug. 20, 1990.
Ritter, Jeffrey B., "Scope of the Uniform Commercial Code: Computer Contracting Cases and Electrical Commercial Practices", 45 Bus. Law 2533, Aug. 1990.
Greenburg, Peter, S., "Judging DeRegulation", The Record, Jul. 22, 1990 at p. T01.
Greenburg, Peter, S., "The Savvy Traveler: Lower Air Fares for Consumers Not in the Cards; Airlines: Remember When It Cost $16 to fly From Los Angeles to San Francisco? Then You Remember the Days Before DeRegulation. Since Then, Prices Have Soared", Los Angeles Times, Jul. 8, 1990 at p. L2.
Wallace, David, "Company Planning to Let Fliers Bid on Airfares", Philadelphia Business Journal, Mar. 26, 1990 at p. 15.
"Mercado electronico, El chance de regatear por computador", CIENCIA Technologia E Informatica, Mar. 21, 1990 (Translation enclosed).
Cole, Jeff, "Fare bidding plan could be the ticket", St. Paul Pioneer Press Dispatch, Mar. 11, 1990.

Miller, Ross M., "The Design of Decentralized Auction Mechanisms that Coordinate Continuous Trade in Synthetic Securities," Journal of Economic Dynamics and Control, pp. 237-253, 1990.

Koepper, Ken, "Room Inventory Auctioning: The Next CRS Generation", Lodging, Jan. 1990 at pp. 26, 29-30.

"Letter to Business Extra", The San Francisco Chronicle, Dec. 26, 1989 at p. C7.

"Business Briefing, Airline Seats May Go on the Auction Block", Insight on the news, Dec. 4, 1989.

"Business Travel Update, Automation", Travel Weekly, Nov. 27, 1989.

Schrage, Michael, "An Experiment in Economic Theory; Labs Testing Real Markets", The Record Section B1, Nov. 26, 1989.

Schrage, Michael Innovation/Michael Schrage: Laboratory Experiments with Market Economics, Los Angeles Times, Nov. 23, 1989 at p. D1.

Golden, Fran "AAL's Riga Doubts Marketel's Appeal to Retailers", Travel Weekly, Nov. 13, 1989.

Del Rosso, Laura, Firm Proposes ticket-bidding system; Marketel explores electronic auction of travel; Marketel International., Travel Weekly, Section No. 91, vol. 48, p. 1; Nov. 13, 1989.

Munro, Don and McCann, David, "A New Way To Purchase Travel, Automated Service Would Let Companies Bid For Already-Filled Airline Seats", Business Travel News, Nov. 6, 1989.

Carlsen, Clifford, "Polaris Group Set to Fly the Leveraged Sky", San Francisco Business Times, Nov. 6, 1989 at p. 1.

"An Electronic Auction Ahead For Airline CRS's?", The Business Week Newsletter for Information Executives, Oct. 27, 1989.

Cohen, Danny, "Electronic Commerce," ISI Research Report, University of Southern California, Oct. 1989.

Coyne, Andrew, "Unbundling ideas may alter world of politics," The Financial Post (Toronto), Section 1, p. 11, Sep. 27, 1989.

Kuttner, Robert, "Computers May Turn the World into One Big Commodities Pit", Business Week, Sep. 11, 1989.

Carlsen, Clifford, "From Airline Tickets to Human Organs, the Electronic Markets Are Booming", San Francisco Business Times, Aug. 14, 1989 at p. 17.

"From Airline Tickets to Human organs, the Electronic Markets are Booming", Times, vol. 3, No. 50, Aug. 14, 1989.

"Public May Submit Bids To Get Bargain Rates", Wall Street Journal, Section 2; p. 1, col. 1; Aug. 1, 1989.

"AUCNET: TV Auction Network System," Harvard Business School, Jul. 19, 1989.

Malone, Thomas W., et al., "Electronic Markets and Electronic Hierarchies," Communications of the ACM, vol. 30, No. 6, Jun. 1987.

Sammer, Harald W., "Online Stock Trading Systems: Study of an Application," IEEE 1987 Spring Conference, pp. 161-162.

Littlefair, T., "Homelink: a unique service," Computer Bulletin, pp. 12-14, Jun. 1986.

Banatre, Jean-Pierre, et al., "The Design and Building of Echere, a Distributed Electronic Marketing System," Communications of ACM, vol. 29, No. 1, Jan. 1986.

Turoff, Murray and Chinai, Sanjit, "An Electronic Information Marketplace," Elsevier Science Publishers B.V., pp. 79-90, 1985.

Banatre, Michel, "Distributed auction bidding system," IPC Business Press, Computer Communications, vol. 4, No. 4, Aug. 1981.

American Airlines Internet Silent Auction, selected pages downloaded from www.americanair.com.

Apollo Host Computer, selected pages downloaded from www.appollo.com.

"Auctioning unsold airline tickets." (http://www.newciv.org/GIB/BOV/BV-409,HTMl), at p. 1.

Cathay Pacific:CyberTraveler Auction #3—Official Rules, selected pages downloaded from www.cathaypacific.com.

CSM Online: About Collector's Super Mall downloaded from www.csmonline.com.

Sabre Decision Technologies, selected pages downloaded from www.sabre.com.

PhoneMiser: Frequently Asked Questions, downloaded from www.phonemiser.com.

The United Computer Exchange: How It All Works, selected pages downloaded from www.uce.com.

"What's Holding Up E-Cash?", Cybernautics Digest, vol. 3; No. 7, Finance.

Tired of Shopping For the Best Home Loan?, Mortgage Loan Specialists.

Business Week (Industrial Edition) Jan. 19, 1987.

*Mercexchange L L C v eBay, Inc.,* et al., Order and Opinion, Civil Action No. 2:01cv736, Oct. 21, 2002.

\* cited by examiner

ONLINE EXCHANGE MARKET SYSTEM WITH A BUYER AUCTION AND A SELLER AUCTION

CROSS REFERENCE TO RELATED APPLICATION

This application is a Continuation-in-Part of U.S. application Ser. No. 08/512,365, filed Aug. 8, 1995, now abandoned.

FIELD OF THE INVENTION

The present invention generally relates to product purchase systems, and more particularly, to a product system accessible via a communications network which facilitates the purchase of products.

BACKGROUND OF THE INVENTION

When purchasing a product, a purchaser must first determine which product, including brand name, model, color and other features, best meets his needs. Once the purchaser has an established interest in purchasing a particular product, the purchaser typically visits, in person or by telephone, a few stores that sell the product to determine the best price. Once the best price is determined, all things being equal, the purchaser usually buys from the store store selling this particular product at the best price.

It would be desirable and advantageous to provide a product exchange system which enables a potential product purchaser to easily and quickly review specific product configurations of interest in combination with final pricing information for those same products in a particular geographic region. It also would be desirable and advantageous to enable a potential product purchaser to ascertain the best price for a particular product and to "lock in" to a specific offer via the system without having to actually visit, or make direct contact with particular sellers.

An object of the present invention is to simplify and reduce the time required, for both the buyer and seller, in completing a product sales transaction.

Another object of the present invention is to enable potential purchasers to quickly and easily ascertain offers for the sale of products in a particular geographic region of interest.

Still another object of the present invention is to provide a product exchange system which enables a potential product purchaser to easily and quickly review all specific product configurations of interest in combination with final pricing information for products in a particular geographic region.

Yet another object of the present invention is to provide an exchange system which enables a potential product purchaser to ascertain the best price for a particular product and to "lock in" to a specific offer via the system without having to actually visit, or make direct contact with, the seller.

SUMMARY OF THE INVENTION

These and other objects and advantages are achieved by a product exchange system which includes, in one embodiment, a file server having a plurality of databases storing specific information related to products offered for sale. The exchange system further includes a processor coupled to the databases and programmed to perform certain tasks in response to price inquiries, special requests, offers to sell, offers to buy and acceptance of such offers.

The present exchange system, in one aspect, serves as a mechanism to drive sellers towards offering a lower price than currently available for products or services purchased by consumers. Unlike known electronic catalog systems wherein prices are merely displayed for various items, the present exchange creates a reverse auction environment wherein sellers effectively bid against each other in an attempt to become the lowest price seller. This result, i.e., driving low price offers, is achieved at least in part by configuring the exchange to display only the lowest price offer when a potential purchaser inquires as to the best or lowest selling price of a particular product. That is, rather than displaying many different prices for a particular product as with known electronic catalog systems, in the present exchange, only the lowest price is displayed. Of course, the lowest price offer may be limited to a particular geographic area. This result, i.e., driving low price offers, also is achieved at least in part by providing mechanisms within the exchange which are operable by sellers to submit new, lowest price, offers to sell. Particularly, the present exchange creates a dynamic bidding environment wherein sellers can submit bids, i.e., lower price offers, against each other to attempt to become the lowest price seller for a particular product within the exchange.

Specifically, the exchange system is coupled to a communications link, such as the telephone lines or the Internet. A potential product purchaser may access, from a remote site, the exchange system via the network, and submit requests to such system. In response to some requests, the system processor retrieves stored data from the respective databases, and causes such data to be transmitted to the remote site for display. The exchange system also executes certain functions in response to commands and data transmitted from seller sites and institution sites, e.g., banks, other lenders or agents for buyers or sellers. The system enables a potential purchaser to, for example, browse the offers in a particular geographic region for the particular product of interest and to lock-in to a particular offer to sell.

The system described above enables a potential product purchaser to easily and quickly review all final pricing information for a variety of products and configurations in a particular geographic region. In addition, such system enables, if desired, the buyer to "lock in" a specific offer via the system.

DETAILED DESCRIPTION OF THE DRAWINGS

Figure 1:
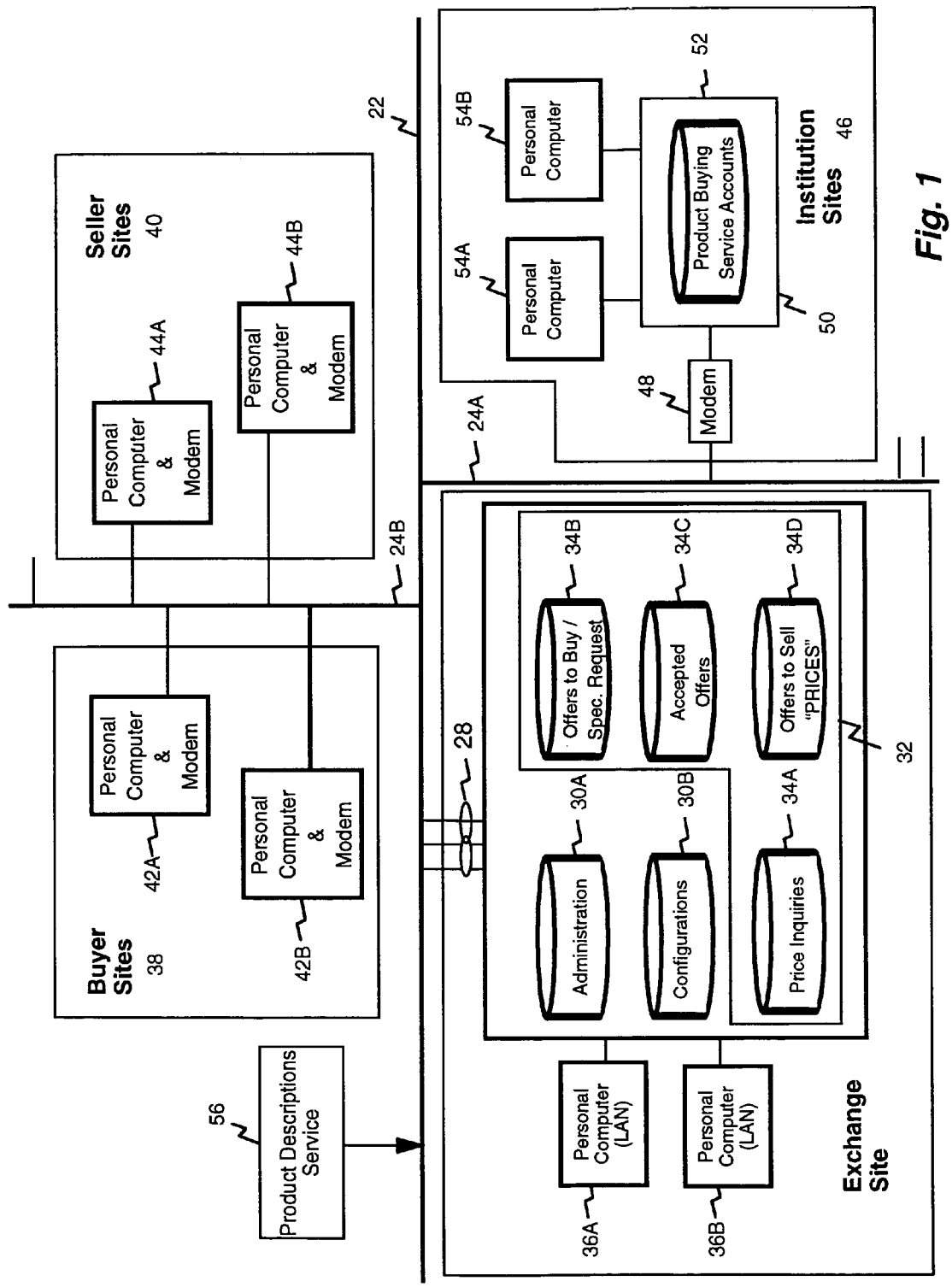
FIG. 1 illustrates a system architecture for a system in accordance with one embodiment of the present invention.

FIG. 1 illustrates a system architecture for a system 20 which includes a communications network 22 having multiple branches 24A–B. Network 22 may, for example, be a wide area network such as the network known as "Internet" or may be one of many other types of networks. Accordingly, although one embodiment of the present invention is described below in the context of a network such as Internet, it should be understood that the present invention may be used in connection with many other types of communications networks.

One embodiment of an exchange system 26 is illustrated in FIG. 1 as being coupled to network 22 via a multi-line communications control and router 28. System 26 includes, for example, a file server having a processor and memory storage. Such file servers are commercially available, such as the IBM RS-600 or HP-9000. Databases 30A–B and 32 are illustrated as forming a part of system 26. Databases 30A–B and 32 would, for example, be part of the memory storage of the file server.

Administration database 30A is utilized for storing data related to tasks executed by system 26. Configurations database 30B stores data related to specific product configurations which may be accessed, via network 22, from remote sites. Database 32 includes a price inquiries database 34A, an offer to buy and special request database 34B, an accepted offers database 34C and an offers to sell ("prices") database 34D. A plurality of personal computers such as personal computers 36A and 36B are coupled to system 26 via a local area network (LAN) to enable access to system 26 without requiring access to network 22.

Buyer sites 38 and seller sites 40 are shown as being coupled to branch 24B of network 22. Particularly, potential buyers, through personal computers and modems 42A and 42B, may access exchange system 26 via network 22. Similarly, sellers, through personal computers and modems 44A and 44B, may access exchange system 26 via network 22. Of course, the functions performed by system 26 for such buyers and sellers are different, as explained hereinafter in more detail.

Institution sites 46 are shown as being coupled to branch 24A of network 22. Such institutions may include lending institutions such as banks. Institutions may access exchange system 26 through modem 48, coupled to a file server 50 having a product buying service accounts database 52, and via personal computers 54A and 54B. Account information for product purchases made by buyers at buyer sites 38 via system 26 may be stored in database 52.

It should be understood, of course, that the architecture illustrated in FIG. 1 may vary depending upon the network utilized. Also, many additional buyer sites 38, seller sites 40 and institution sites 46 may be coupled to system 26. Further, a geographic area such as a country, e.g., the United States of America, could be divided into regions with separate systems 26 serving such regions.

Figure 2:
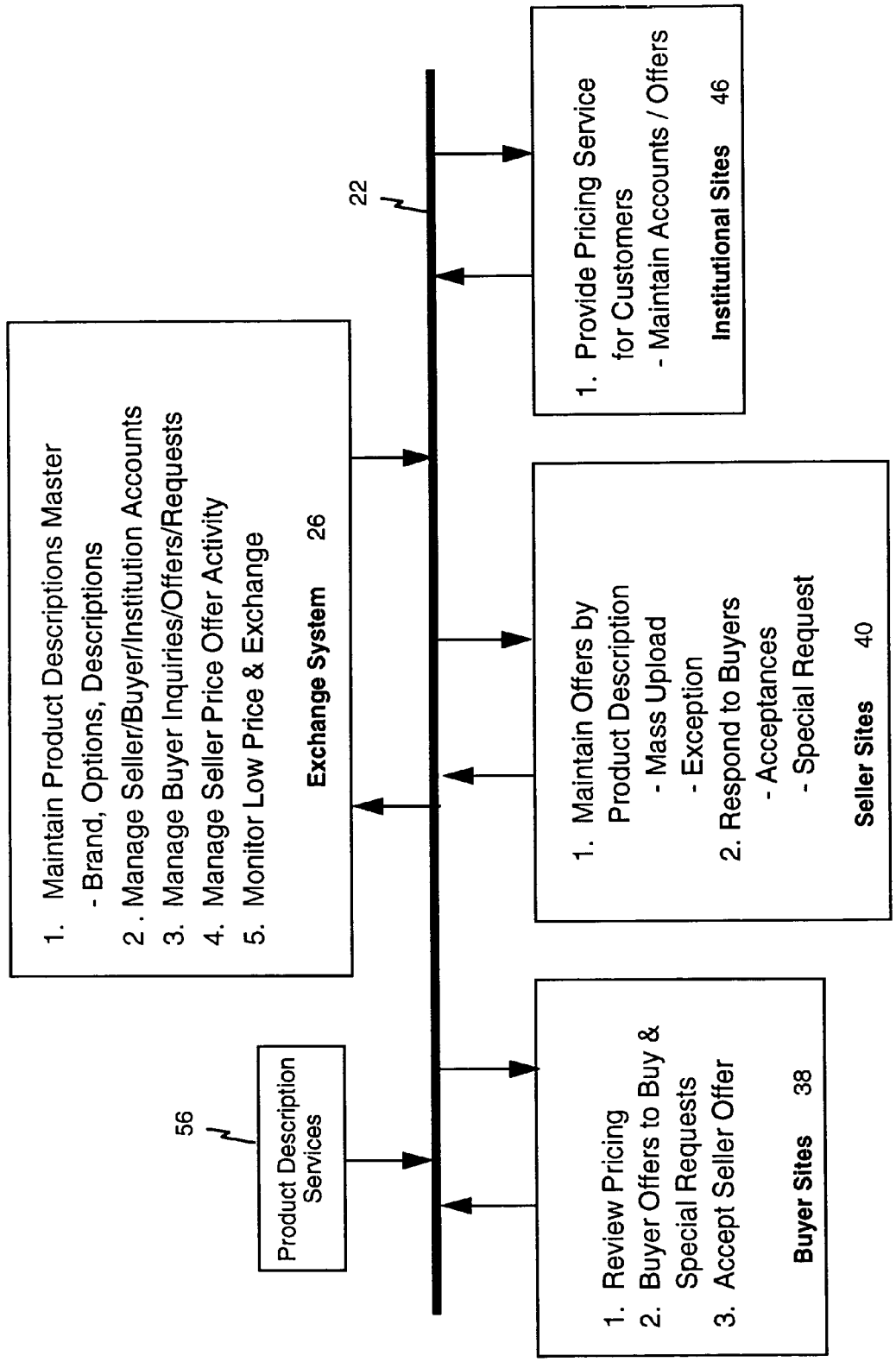
FIG. 2 is a functional block diagram illustrating the tasks performed by each hardware block shown in FIG. 1.

FIG. 2 illustrates, for sites 38, 40 and 46 and system 26, some functions performed at such sites 38, 40 and 46 and by system 26. More specifically, with respect to system 26, product configuration master files which include a base description, an options description and descriptions of other information pertinent to particular products, are maintained by system 26. System 26 also maintains specific accounts related to sellers, buyers and institutions that use system 26. Certain activities also are tracked, for example, for buyer inquiries, offers and special requests, by system 26. Further, seller price offer activity and specific price offers are maintained within databases in system 26.

With respect to buyer sites 38, at such sites, a potential buyer may, via personal computer and modem 42A–B, enter commands to cause system 26 to execute routines to enable such buyer to review pricing, make offers, special requests and accept a seller offer. At seller sites 40, sellers may, via personal computer and modem 44A–B, enter commands to cause system 26 to execute routines to enable such seller to, by a mass upload to system 26 or by exception, maintain offers by base model and options in databases of system 26. In addition, sellers may respond to specific buyer acceptances and special requests communicated to seller sites 40 from buyer sites 38 via system 26. The manner in which certain functions are executed by system 26 is described hereinafter in more detail.

At institution sites 46, institutions may provide pricing service for customers via system 26. Such institutions may also maintain, in file server 50, information regarding individual accounts and offers.

Product configuration services 56 may provide data to system 26 related to particular product brands and models. In this manner, system 26 may compliment existing services which provide, on-line, product configuration information.

Figure 3:
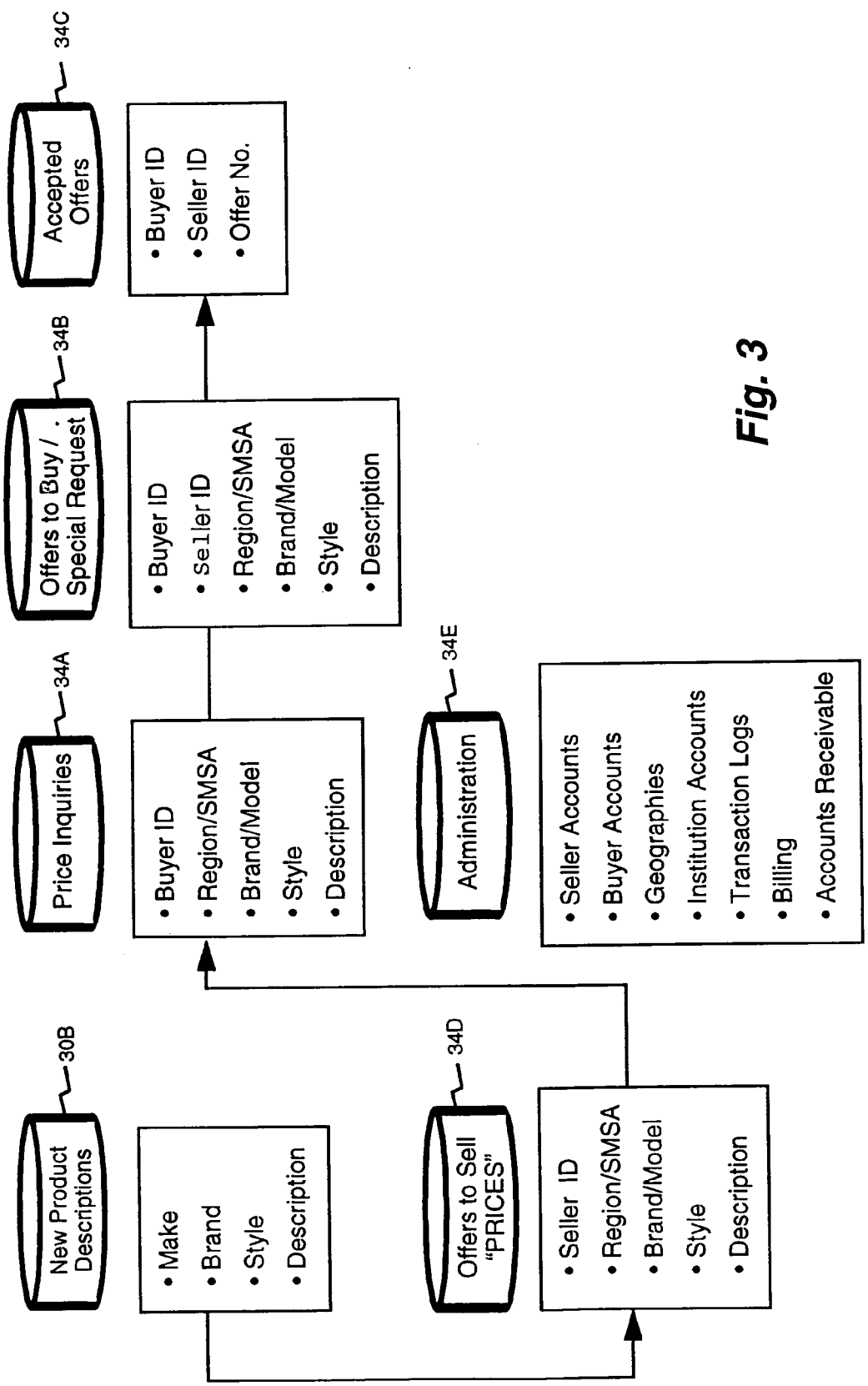
FIG. 3 illustrates the system database structure for the system illustrated in FIG. 1.

FIG. 3 illustrates various types of information stored in databases 30B and 34A–E of exchange system 26. No particular hierarchy is intended to be expressed or implied by the arrows shown in FIG. 3. Rather, such arrows are only intended to facilitate an understanding of such data and the interrelationships. Further, it should be understood that although specific databases are referred to, the data in any one of the databases may be distributed or combined in many different configurations with data from other databases. Therefore, the database configuration illustrated in FIG. 3 and described below is provided primarily to facilitate an understanding of system 26, and should not be construed as a limitation of system 26.

Referring specifically to FIG. 3, in configurations database 30B, information regarding new products is stored. Such information includes, for each designated product, make, brand, style and other descriptive. Such information typically provides a detailed description of each particular product. Note that although information regarding a particular product may be stored in configurations database 30B, a particular seller may not have made a specific offer for that specific configuration. Therefore, data stored in configurations database 30B may not necessarily match information stored in offers to sell database 34D.

With respect to offers to sell database 34D, information such as an identification of the seller making an offer, the seller region, and pricing information by brand/model, style and descriptions is stored. Such information identifies, by sellers having specific geographic selling locations, offers to sell certain products.

In price inquiries database 34A, information related to potential buyer inquiries is stored. Such information includes an identification of each buyer, by identification number, who makes an inquiry to offers to sell database 34D, the buyer's geographic region, and the product brand/model, style and options which were the subject of the buyer inquiry.

Buyer offers and special request database 34B is utilized by system 26 for storing information related to offers made by buyers and special requests made by potential buyers, via system 26, to a seller. For example, a buyer may request an updated price offer based on a unique selection of options. For each such buyer offer and special request, buyer and seller identifications, geographic region, and make/model, style and options information is stored in database 34B.

System 26 stores, in accepted offers database 34C and for each offer accepted via system 26, an identification of the buyer and seller and an offer number, which is assigned to the accepted offer by system 26. Such information may be used, for example, for billing purposes.

With respect to administration database 34E, information related to seller accounts, buyer accounts, and geographic locations for buyers and sellers is stored. Also, institution accounts, transactions logs, system billing, and accounts receivable information is stored in such database 34E.

As pointed out above, the specific architecture and structure of databases 30B and 34A–E may, of course, vary and is not limited to the specific structure illustrated in FIG. 3. In addition, although databases 30B and 34A–E are shown as being separate, such databases could be consolidated or distributed in many other configurations. Further, information in addition to the specific data described above could be stored in, and form a part of, such databases.

Figure 4:
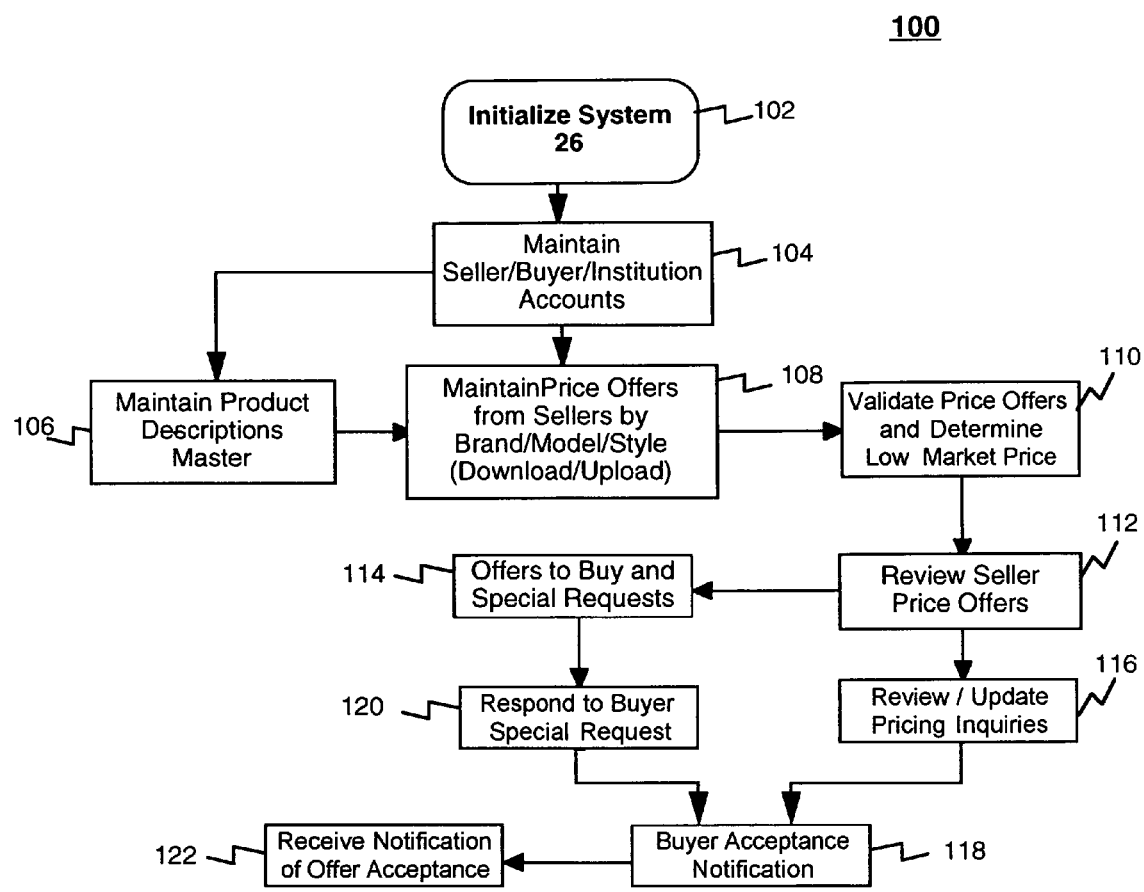
FIG. 4 illustrates a sequence of steps executed by one embodiment of the exchange system as part of the product purchasing process.

FIG. 4 illustrates functions 100 performed by exchange system 26. Functions 100 are illustrated in a logic diagram form. However, it should be understood that such functions 100 could be performed in any sequence, in a distributed manner, or in parallel, and no specific execution order is intended, expressed or implied, by such flow. Also, any one of the functions illustrated in FIG. 4 could be performed without necessarily performing, within a certain time limitation, any of the other functions.

Referring now particularly to FIG. 4, upon initialization 102 of system 26, functions performed by system 26 include maintaining seller, buyer and institution accounts 104, maintaining new product configuration masters 106, and maintaining price offers by sellers by make, model, style and options 108. Such maintenance functions are described hereinafter in more detail and generally require maintaining current information in the various databases of system 26.

Exchange system 26 also validates price offers 110. For example, once a seller at a seller site 40 communicates a specific offer to sell a product, system 26, prior to loading such offer in database 34D, displays the information which is the subject of the offer to the seller. If the information is correct, the seller enters a command on computer 44A, for example, and system 26 then loads the validated information into database 34D.

System 26 also is configured to determine, upon receiving a buyer command, a low market price 110 for a selected specific configuration within a designated geographic region. Particularly, a potential buyer at a buyer site 38 may want to place a specific "offer to buy" or identify a specific desired product configuration and a particular geographic region in which such buyer would be willing to travel within to obtain a product. Such information is then loaded into computer 42A, for example, through a graphical user interface. Such information is then transmitted to system 26. Using such inputted information, offers to sell database 34D is scanned to identify matches for the selected product configuration offered for sale in the selected geographic region. The selling prices are then compared for such matches, and the lowest selling price is then caused to be displayed by system 26 at computer 42A. Exchange system 26 also enables, upon receipt of a buyer command, a buyer to review seller price offers 112 for a variety of products.

If a buyer desires to make an offer or a special request of a seller, such requests may be made to a seller 114 through system 26. Exchange system 26 also enables a buyer to review and update pricing inquiries 116, and if a buyer accepts a seller offer via system 26, system 26 generates a buyer acceptance notification 118.

With respect to offers to buy and special requests 114, exchange system 26 communicates such offers and requests to the buyer designated seller and enables such seller to respond to the offer or request via system 26. If a seller response to a special request is acceptable, the buyer may accept the seller's offer and system 26 will generate acceptance notification 118. Exchange 26 also generates, for the seller, a notification of offer acceptance 122. Of course, if a seller accepts an offer to buy 114, exchange 26 generates a notification of the seller acceptance.

Figure 5:
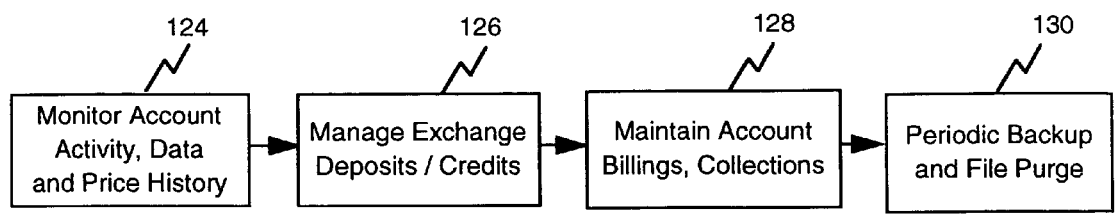
FIG. 5 illustrates the various administrative tasks performed by the exchange system.

Administration tasks performed by system 26 generate data to be stored in administration database 38 (FIG. 1). More specifically, and as shown in FIG. 5, system 26 monitors account activity and data 124, manages deposits and credits 126, maintains account billings and collections 128 and performs periodic backup and file storage operations 130. Data related to such activities is loaded in administration database 30A and may later be utilized, for example, to generate buyer and seller billing for access and use of system 26.

Figure 6:
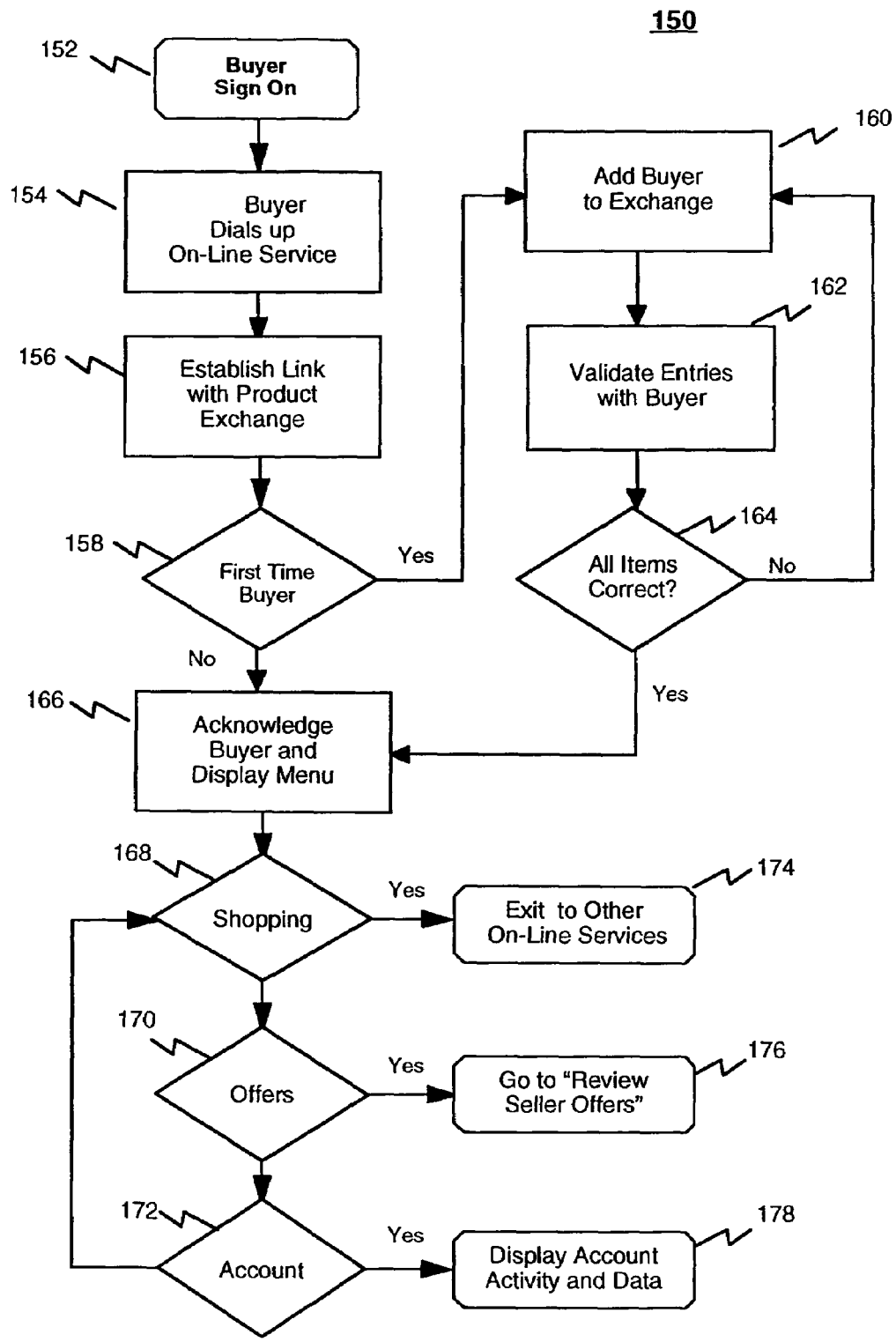
FIG. 6 illustrates one embodiment of a sequence of process steps executed to access the exchange system.

FIG. 6 illustrates a sequence of process steps 150 executed in connection with performing a buyer sign-on 152 to exchange 26. Specifically, to perform a sign-on 152 at a buyer site 38 (FIG. 1), personal computer 42A, for example, first accesses network 22 via an on-line service 154 such as CompuServe. A link 156 is established through communications network 22 with system 26. System 26 then requests buyer identification information to determine whether the specific user is a first-time potential buyer 158. If the buyer is a first time user, then buyer information is added 160 to the administration database 30A. System 26 then validates the buyer's entries 162, for example, by displaying such entries to the buyer at computer 42A. If all the entries are not correct 164, then the buyer may edit such entries. Otherwise, if the entries have been correctly entered, system 26 acknowledges proper access by the buyer and displays a menu 166 at personal computer 42A, for example. If the buyer is not a first-time buyer, operations would proceed directly to acknowledging the buyer and displaying a menu 166.

The menu displayed to a buyer, for example, is a graphical user interface which enables the buyer to select from various options such as shopping 168, offers 170, and account 172. Once the buyer has selected an option, system 26 responds to such selection. For example, if the buyer selects "shopping" 168, since this service is not executed by system 26, system 26 prompts the buyer to logoff system 26. On the other hand, if the buyer selects "offers" 170, then system 26 executes the sequence of process steps associated with reviewing seller price offers 176. If the user selects account 172, then system 26 will cause account activity 178 for the subject buyer to be displayed at the buyer's computer.

Figure 7:
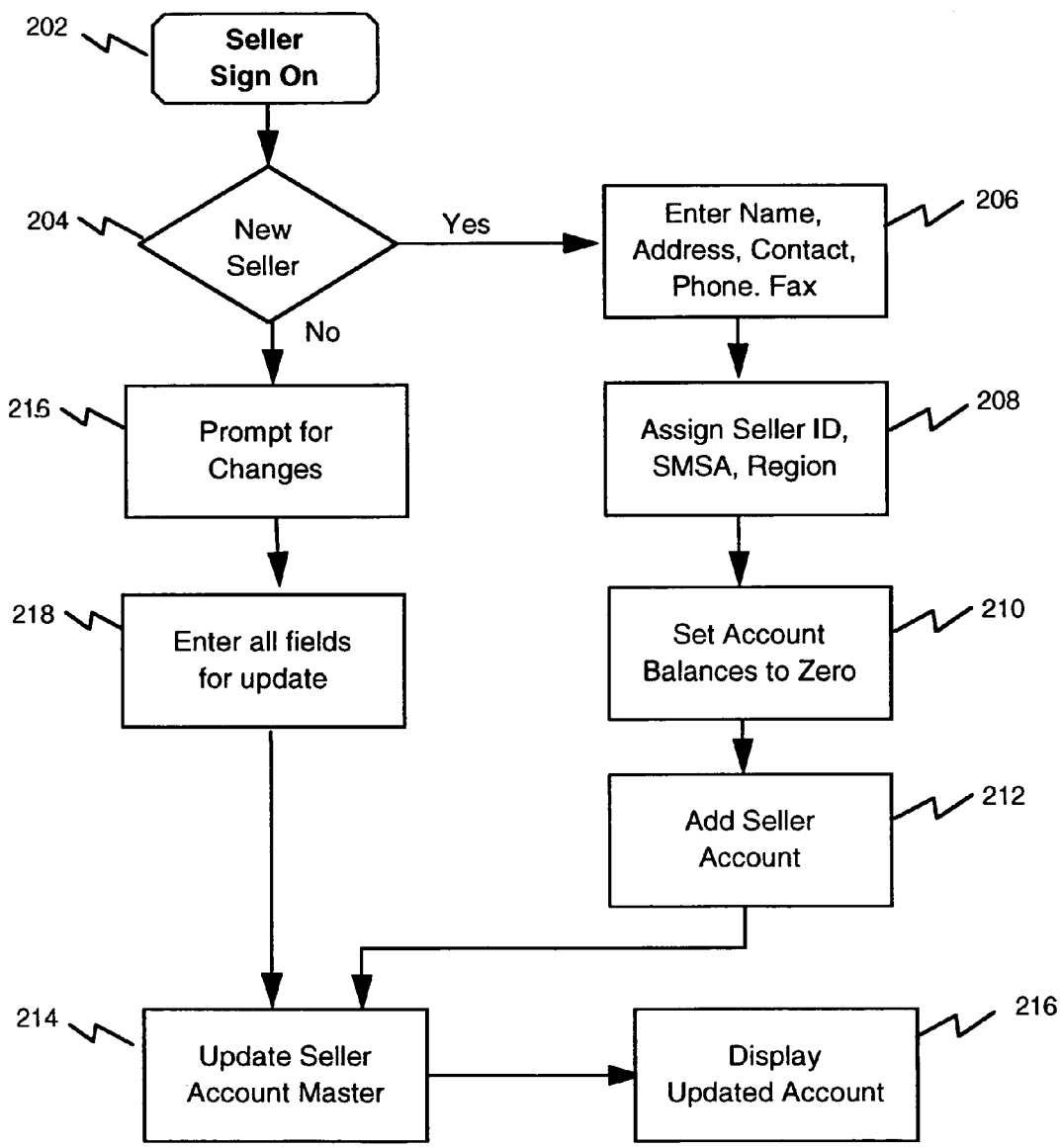
FIG. 7 illustrates a sequence of process steps to be performed in connection with creating a seller account in the exchange system.

FIG. 7 illustrates a sequence of process steps 200 associated with a seller sign-on operation 202. Specifically, a seller accesses system 26 through a personal computer and modem configuration 44A, for example, through branch 24B of network 22. A communications link is then completed with system 26. Once a seller has accessed system 26, system 26 determines whether the particular seller is a new seller to the system 204. Such a determination is made, for example, by checking the administration database 30A for the seller identification.

If the seller is a new seller to system 26, then the seller is prompted to enter name, address, contact, telephone and fax information 206. System 26 then assigns the seller an identification number and an SMSA region 208. System 26 also sets all account balances for the seller to zero 210 and adds the seller account 212 to administration database 30A. Once such an account is established, the seller may update the seller account master information 214 stored in administration database 30A.

If the seller is not a new seller 204, then system 26 will prompt the seller and request entry of new or updated data 216. A seller may update information in any and all fields for information stored by system 26 with respect to such seller 218. Once such data has been entered, then system 26 updates the account master for the seller 214 stored in administration database 30A. Once all such information has been entered and stored by system 26, all the updated account information is caused, by system 26, to be displayed at personal computer 44A, for example, to enable the seller to review such information and to ensure its correctness 216.

Figure 8:
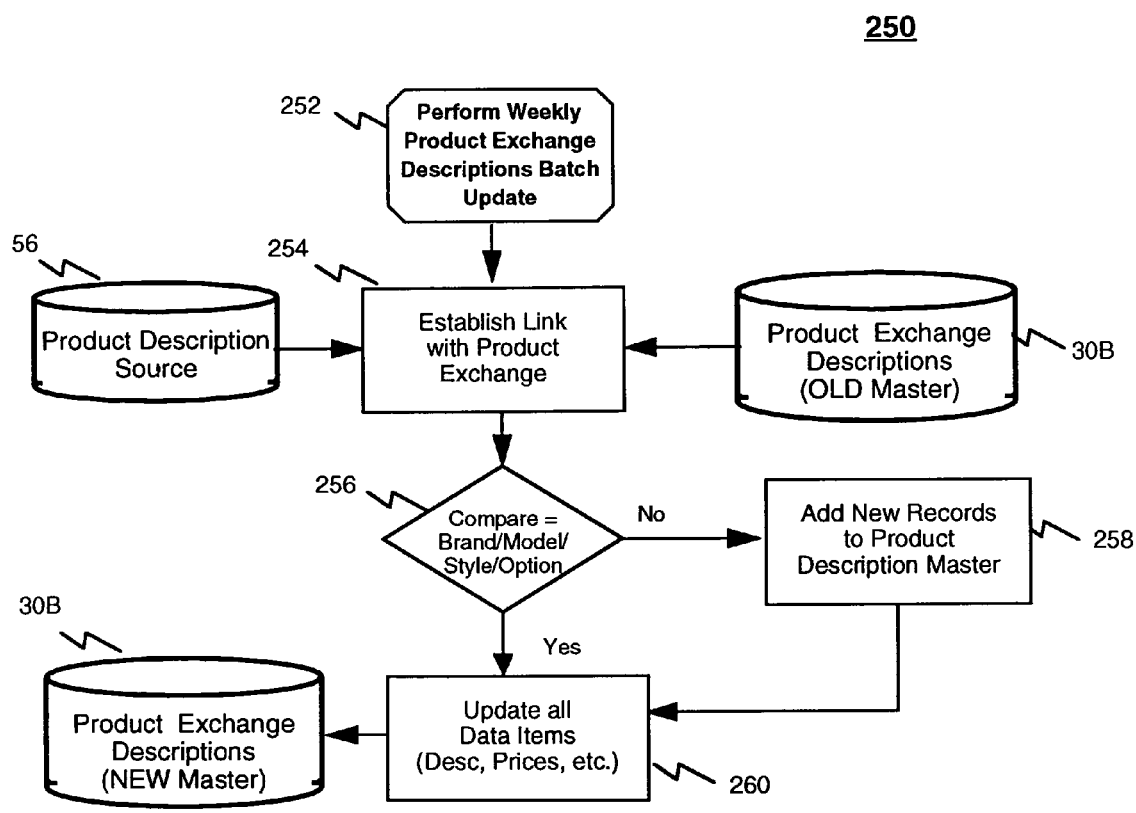
FIG. 8 illustrates the process steps executed in connection with updating configuration data stored in the configuration database of the system.

FIG. 8 illustrates a sequence of process steps 250 executed by system 26 to perform a batch update 252 of all product configuration data stored in configuration database 30B. Particularly, process steps 250 would be executed by system 26 on a weekly or some other regular basis. Such update would be performed to ensure that all new master files related to products being offered through system 26 have been updated and saved in an appropriate manner.

Referring to process 250 in more detail, system 26 first reads/uploads the latest source file configurations from configurations database 30B. System 26 also may read/upload configurations from other sources such as third party configuration sources 56. Once such configurations are uploaded into active memory of system 26, then the newly entered product configurations since the last batch update, which may be stored in a buffer memory, are compared with the existing configurations in configurations database 30B at step 256. If for any particular product configuration such configuration does not exist in configuration database 30B, a new record is created for such new product configuration 258 and the new record is added to the other records which will be stored in configurations database 30B. If the product configuration is already stored in configurations database 30B, then operations proceed to block 260, where all information is updated 260 by copying all records in active memory of system 26 to configurations data base 30B. Such updated information in configurations database 30B forms the new master records which may be accessed by both buyers and sellers as described above.

Figure 9:
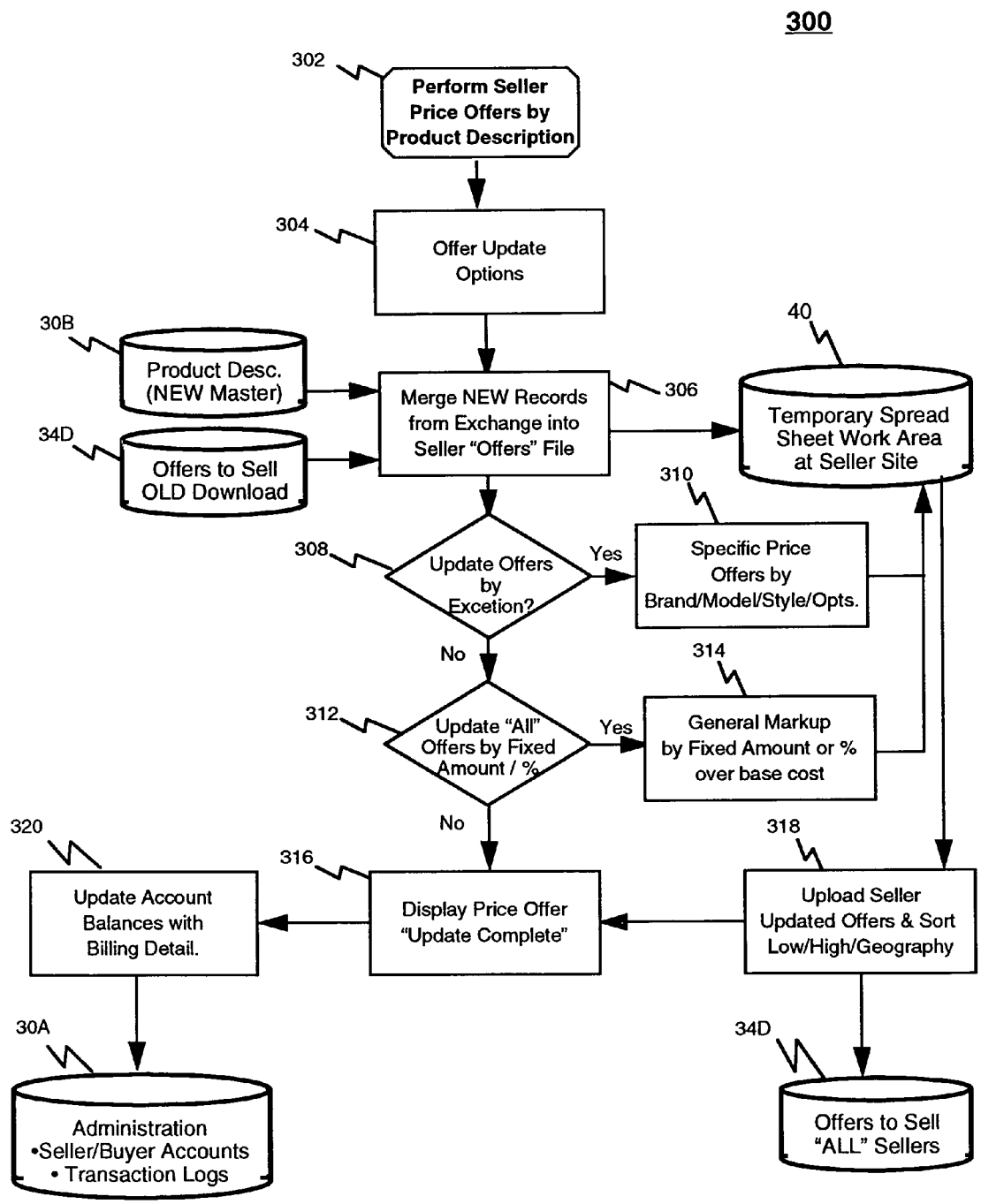
FIG. 9 illustrates the sequence of process steps executed in loading product offers into a system database.

FIG. 9 illustrates a sequence of process steps 300 which would be performed by seller at a site 40 on a personal computer and modem configuration 44A, for example, to enter an offer into system 26. More specifically, once a seller at a seller site 40 has initialized 302 system 26, system 26 prompts 304 such seller as to whether such seller would like to update seller data stored in the various databases of system 26. System 26 then merges 306 information from product configurations database 30B for the most recently updated master records and from the offers to sell database 34D. Such information is merged by system 26 to form an integrated new record for an interim seller's offer file at site 40 displayed at computer 44A. If the seller determines to update or create new records, the seller may modify the records as displayed and upon completion of such updating, the new/updated records are loaded to form an updated offers to sell database 34D. The seller at the seller site 40 also is prompted by system 26 as to whether such seller would like to update the offers to sell database 34D for the seller's records by exception 308. If a seller does desire to update such offers by exception, then such seller may update specific information, such as pricing information, by a selected amount or percentage 310. Such updated information is stored in the interim file and may subsequently be loaded into database 34D by system 26 at step 318.

If a seller does not desire to update such offers by exception, the seller is then prompted by system 26 as to whether such seller would desire to update the pricing information for each configuration by a fixed amount or percentage 312. If a seller would like to perform such an update, the seller may indicate the general dollar amount mark-up or percentage over factory invoice at 314. Again, such updated information is stored in the interim file and may subsequently be loaded into database 34D by system 26.

If the seller does not desire to perform any such updates, or once such updates have been completed via step 318, then system 26 causes the display at seller site 40 to indicate that the price offer database update has been completed 316.

Administration database 30A is then updated with new account balances for the seller performed functions 320. The seller could, of course, have a price offer report printed-out at seller site 40. If the seller selects to have such information printed, then the price offer report is printed-out at the seller site 40 from the updated records in offer to sell database 34D for that seller by make, brand, options and style.

Internally within system 26, and for current records within offers to sell database 34D for each product configurations, such records may be sorted by configuration to identify and store such information by lowest offer first. Such information may be stored in database 34D for all offers to sell in this manner.

Figure 10:
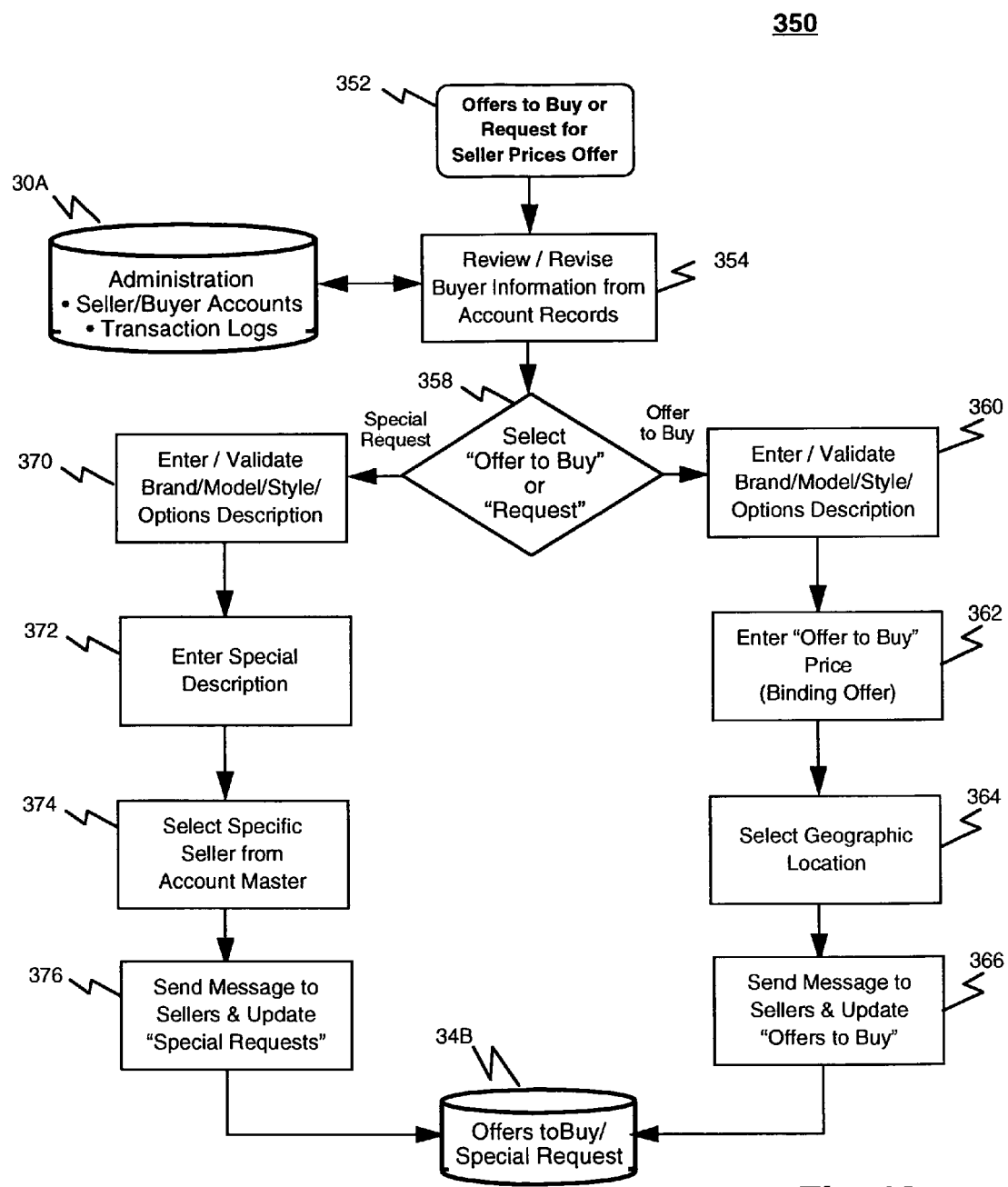
FIG. 10 illustrates a sequence of process steps associated with executing offers to buy and special requests.

FIG. 10 illustrates a sequence of process steps 350 associated with enabling a buyer at buyer site 38 to make an offer to buy in a selected geographic region or a special request to a specific seller at a seller site 40 via exchange system 26. Such operations are referred to as an offer to buy or a special seller request. Particularly, once a buyer accesses 352 system 26 at a buyer site 38, the buyer sign-on process is executed as illustrated in FIG. 6 as process 150. Through such sequence of process steps, buyer information may be reviewed and revised 352 from administration database 30A.

The buyer may then enter and select a make, model, options and style of product which the buyer desires to purchase 354. The buyer then selects whether to make an "offer to buy" or a "request" 358. If the buyer desires to make an offer to buy, then the buyer enters and validates the specific product configuration related to the offer 360. Once such configuration information is entered, the buyer then enters the price 362 and selected geographic regions 364. Exchange system 26 then receives this information and sends an offers message to sellers within the selected geographic region 366 and updates offers to buy/special request database 34B.

If the buyers desires to make a request 358, then the buyer enters and validates the product configuration data related to the request 370, enters special options 372, and selects a specific seller from the account master in database 30A of system 26. Exchange system 26 then receives the special requests, transmits the request to the specified seller and updates the special requests database 34B with a copy of the subject request. The message may be stored, for example, at the personal computer 44A at the selected seller site 40 and the message may be stored in an E-mail location specified by the seller.

Figure 11:
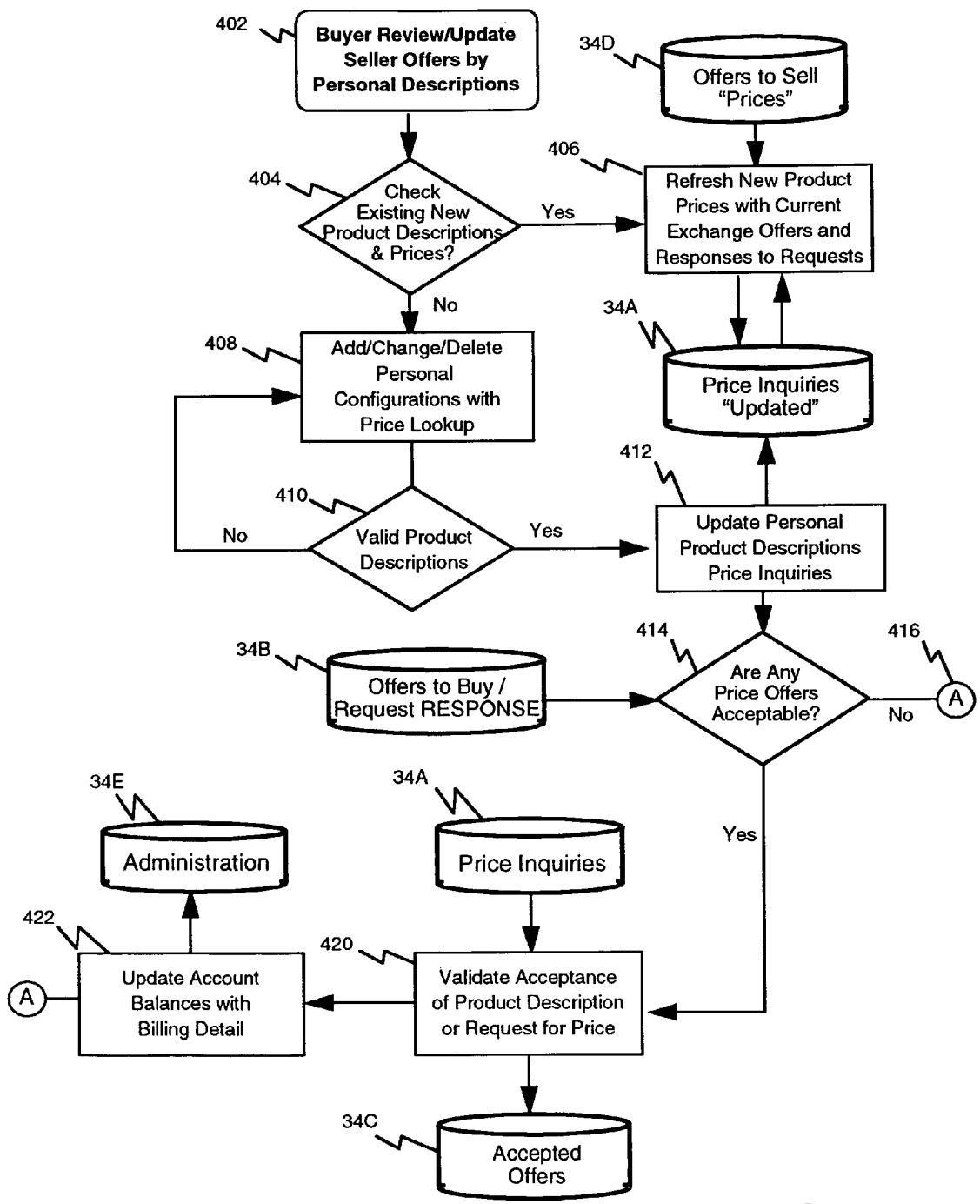
FIG. 11 illustrates a sequence of process steps associated with enabling review/update of prior offers contained in the offer to sell database of the system.

FIG. 11 illustrates a sequence of process steps 400 which would be executed by system 26 in connection with a buyer accepting a seller offer from the offers stored in offer to sell database 34D. Particularly, a buyer at a buyer site 38, on a personal computer 42A, for example, accesses 402 system 26 and indicates whether the buyer wants to review existing seller offers by descriptions 404. If the buyer wants to review such existing description and price selections, then such information is obtained from the offers to sell database 34D and from any seller responses in special requests database 34B, and such information is displayed to the potential buyer at step 406.

The buyer may add, change or delete a particular product configuration as indicated at a step 408. Specifically, if a buyer selects or desires to delete a particular configuration, the make, model, option and style would be deleted from the buyer's price inquiries which are stored in the price inquiries database 34A into the local memory of personal computer 42A.

Once a buyer has selected a particular description which the buyer desires to have pricing information on, system 26 first determines whether such a description is a valid description 410. Such a determination is made, for example, by comparing the selected description with the descriptions stored in descriptions database 30B. If the description is not valid, then operations return to step 408 in which a buyer may select a different description.

If the description is valid, operations proceed to step 412 in which for the particular descriptions selected, the prices are obtained by system 26 from the offer to sell database 34D and such information is added to the particular description information currently then being displayed at personal computer 34A and are added to the price inquiry database 34A. If, upon the buyer's review, there is at least one offer which is acceptable 414, system 26 validates acceptance of the offer by rechecking the data and ensuring that the offer to sell from offer to sell database 34D is still current 420. If such information is validated, then the accepted offer information is stored in accepted offers database 34C and for the particular seller and buyer, the account balances are updated 422 and stored in a buyer's accounts transaction log in system 26. If no offers are acceptable 414, processing proceeds directly to step 422.

Figure 12:
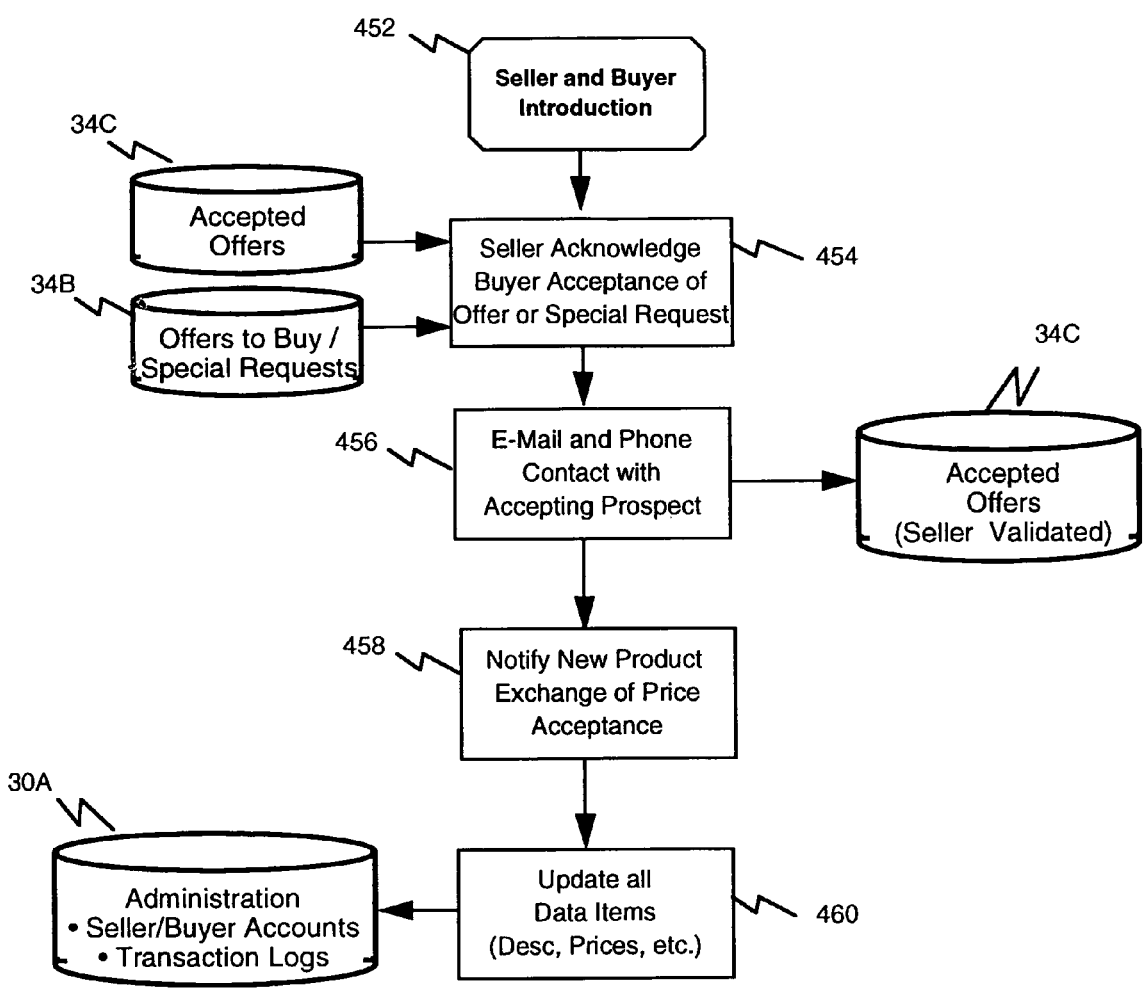
FIG. 12 illustrates a sequence of process steps executed in connection with acknowledgement of acceptance of an offer.

FIG. 12 illustrates a sequence of process steps 450 executed by system 26 in connection with the seller and buyer introduction process 452. Particularly, once a buyer has accepted an offer in accordance with the sequence of steps 400 as illustrated in FIG. 11, the seller that made the offer is informed of such acceptance by system 26 and may acknowledge, via personal computer 44A at seller site 40, for example, the particular acceptance of the offer or a special request as stored in accepted offers database 34C and special request database 34B, as indicated at step 454.

Once the seller receives information regarding such an acceptance as set forth in step 454, then the seller may make contact with the potential buyer 456 via E-mail, telephone or even through system 26. If the transaction is concluded between the buyer and the seller, then accepted offers database 34C is updated by the seller at seller site 40 and system 26 at step 458. System 26 then executes administrative tasks with database 30A as indicated at 460 and the seller account, buyer account, transaction log is updated in administration database 30A.

The above described system 26 enables a potential product purchaser to easily and quickly review all models and other information regarding specific product configurations of interest in combination with final pricing information for products in a particular geographic region. System 26 also enables a potential product purchaser to ascertain the best price for a particular product and to "lock in" to a specific seller offer via the system.

From the preceding description of an embodiment of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. An exchange for facilitating online purchases and sales via a communications network, said exchange comprising:
   a control unit for coupling to the communications network;
   a server coupled to said control unit and comprising an offer to sell database for storing specific offers to sell, an offer to buy database for storing specific offers to buy, an administration database for storing information related to seller accounts and buyer accounts, and a processor programmed to:
   receive offers to sell from potential sellers, said offers to sell defining actual offers to sell, said processor further programmed to download said offers to sell into said offer to sell database;
   receive a buyer inquiry from a potential buyer, the buyer inquiry defining a desired purchase, upon receipt of the buyer inquiry, said processor programmed to compare offers stored in said offer to sell database with parameters of the buyer inquiry, and if one or more offers to sell are identified that match the buyer inquiry, designating only a lowest price identified offer to sell which matches the buyer inquiry for being communicated to the buyer;
   receive offers to buy from potential buyers, said offers to buy defining actual offers to buy, said processor further programmed to download said offers to buy into said offer to buy database;
   receive a seller inquiry from a potential seller, said seller inquiry defining a desired sale, upon receipt of the seller inquiry, said processor programmed to compare offers to buy stored in said offer to buy database with parameters of said seller inquiry, and if one or more offers to buy are identified that match said buyer inquiry, designating said offers to buy for being communicated to the seller;
   said processor further programmed to download, into said administration database, acceptance data upon acceptance of an offer stored in at least one of said databases.

2. An exchange in accordance with claim 1 wherein at least some of said offers comprise temporal and quantitative limitations.

3. An exchange in accordance with claim 1 wherein the inquiry comprises identification of a geographic region, and said processor is programmed to designate only an offer within said geographic region for communication.

4. An exchange in accordance with claim 1 wherein said processor is further programmed to generate an acceptance notification, including identification of the buyer and seller, upon acceptance of an offer stored in at least one of said databases, said notification designated for communication.

5. An exchange in accordance with claim 1 wherein the electronic data communications network is a wide area network.

6. An exchange in accordance with claim 1 wherein said processor is programmed to, upon the receipt of a predetermined command, designate a special request from a buyer for communication to at least one seller.

7. A method for operating an exchange, the exchange being coupled to a communications network and including an offer to sell database for storing specific offers to sell, an offer to buy database for storing specific offers to buy, and an administration database for storing information related to seller accounts and buyer accounts, said method comprising the steps of:
  upon receipt of offers to sell from potential sellers, downloading the offers to sell into the offer to sell database;
  upon receipt of a buyer inquiry from a potential buyer, comparing offers stored in the offer to sell database with parameters of the buyer inquiry, and if one or more offers to sell are identified that match said buyer inquiry, designating only a lowest price identified offer to sell for being communicated to the buyer;
  upon receipt of offers to buy from potential buyers, downloading said offers to buy into the offer to buy database;
  upon receipt of a seller inquiry from a potential seller, comparing offers to buy stored in the offer to buy database with parameters of the seller inquiry, and if one or more offers to buy are identified that match the seller inquiry, designating the offers to buy for being communicated to the seller; and
  upon receipt of acceptance of an offer, downloading acceptance data into the administration database.

8. A method in accordance with claim 7 wherein the inquiry comprises identification of a geographic region, and wherein only offers within the geographic region are designated for being communicated.

9. A method in accordance with claim 7 wherein at least some of the offers comprise temporal and quantitative limitations.

10. A method in accordance with claim 7 further comprising the step of generating an acceptance notification, including identification of the buyer and seller, upon acceptance of an offer stored in at least one of the databases.

11. A method in accordance with claim 7 further comprising the step of upon the receipt of a predetermined command, designating a special request from a buyer for communication to at least one seller.

12. An exchange for facilitating online purchases and sales via a communications network, said exchange comprising:
  a control unit for coupling to the communications network;
  a server coupled to said control unit and comprising an offer to sell database for storing specific offers to sell, and an administration database for storing information related to seller accounts and buyer accounts, and a processor programmed to:
    receive offers to sell from potential sellers, said offers to sell defining actual offers to sell, said processor further programmed to download said offers to sell into said offer to sell database;
    receive a buyer inquiry from a potential buyer, the buyer inquiry defining a desired purchase;
    upon receipt of the buyer inquiry, said processor programmed to compare offers stored in said offer to sell database with parameters of the buyer inquiry, and if one or more offers to sell are identified that match the buyer inquiry, designating only a lowest price offer to sell which matches the buyer inquiry for being communicated to the buyer;
    said processor further programmed to download, into said administration database, acceptance data upon acceptance of an offer stored in said offer to sell database.

13. An exchange in accordance with claim 12 wherein the buyer inquiry comprises identification of a geographic region for the desired purchase, and said processor is programmed to designate only offers within said geographic region for being communicated to the buyer.

14. An exchange in accordance with claim 12 wherein said processor is programmed to, upon the receipt of a predetermined command, designate a special request from a buyer for communication to at least one seller.

15. An exchange in accordance with claim 12 wherein said processor is further programmed to generate an acceptance notification, including identification of the seller and the buyer, upon acceptance of an offer stored in said offer to sell database, said notification designated for communication.

16. An exchange in accordance with claim 12 wherein the electronic data communications network is a wide area network.

17. A method for using a computer to facilitate a transaction over a network between at least one of a plurality of buyers and at least one of a plurality of sellers, comprising:
  inputting into the computer a first offer to sell which includes an offer price;
  inputting into the computer a second offer to sell which includes an offer price, the second offer price being lower than the first offer price;
  outputting only the lower offer price after receiving a buyer request; and
  inputting into the computer an acceptance from the buyer, the acceptance being responsive to the offer to sell having the lower offer price.

18. A method for using a computer to facilitate a transaction over a network between at least one of a plurality of buyers and at least one of a plurality of sellers, comprising:
  inputting into the computer a plurality of offers to sell which include offer prices, one of the offer prices being lower than any other currently valid offer price;
  outputting data related only to the lowest offer price after receiving a buyer request; and
  inputting into the computer an acceptance from a buyer, the acceptance being responsive to the offer to sell having the lowest offer price.

19. An apparatus for facilitating a transaction over a network between at least one of a plurality of buyers and at least one of a plurality of sellers, comprising:
  a storage device, and
  a processor connected to said storage device;
  said storage device storing a program for controlling said processor, said processor operative with the program to:

receive, over the network, offers to sell from a plurality of sellers, which offers to sell include offer prices, one of the offer prices being lower than a currently valid offer price;

make the offer to sell having the lowest offer price available, over the network, to the buyer; and receive, over the network, an acceptance from the buyer, the acceptance being responsive to the offer to sell having the lowest offer price.

20. An exchange in accordance with claim 19 wherein said processor is operative with the program to designate only offers within a selected geographic region for being communicated to the buyer.

21. An exchange in accordance with claim 19 wherein said processor is operative with the program to designate a special request from a buyer for communication to at least one seller.

22. An exchange in accordance with claim 19 wherein said processor is operative with the program to generate an acceptance notification, including identification of the seller and the buyer, upon acceptance of an offer.

23. An exchange in accordance with claim 19 wherein the network is a wide area network.

24. An apparatus for facilitating a transaction over a network between at least one of a plurality of buyers and at least one of a plurality of sellers, comprising:

a storage device, and a processor connected to said storage device;

said storage device storing a program for controlling said processor and an administration database utilized to store information related to buyer accounts and seller accounts, said processor operative with the program to:

receive, over the network, an offer to buy a selected product, which offer to buy includes a specific product configuration and an offer price;

send, over the network, the offer to buy to a plurality of sellers;

receive, over the network, an acceptance from one of the sellers, the acceptance being responsive to the offer to buy;

download acceptance data into the administration database;

transmit the acceptance data to the buyer; and validate acceptance by the buyer of the acceptable offer to sell by the seller.

25. An apparatus in accordance with claim 24 wherein said processor further operative with the program to send, over the network, the offer to buy to a plurality of sellers in a geographic region selected by the buyer.

26. An apparatus in accordance with claim 24 wherein said processor further operative with the program to receive, over the network, an offer to buy a selected product, which offer to buy includes at least one option and style of the product.

27. An apparatus in accordance with claim 24 wherein said processor further operative with the program to receive, over the network, an offer to buy a selected product, which offer to buy includes a make and model of the product.

28. A method for operating an exchange, the exchange being coupled to a communications network and including an offer to sell database for storing specific offers to sell, an offer to buy database for storing specific offers to buy, and an administration database for storing information related to seller accounts and buyer accounts, said method comprising the steps of:

receiving an offer to buy a selected product from a potential buyer, the offer to buy includes a specific product configuration and an offer price;

downloading the offer to buy into the offer to buy database;

sending the offer to buy to a plurality of sellers;

receiving an acceptance from one of the sellers, the acceptance being responsive to the offer to buy;

downloading acceptance data into the administration database; and validating the offer to sell.

29. A method in accordance with claim 28 wherein said step of receiving an offer to buy includes the step of receiving an offer to buy that includes identification of a geographic region, said step of sending the offer to buy includes the step of sending the offer to buy only within the identified geographic region.

30. A method in accordance with claim 28 wherein said step of receiving an offer to buy a selected product includes the step of receiving an offer to buy that includes at least one option and style of the product.

31. A method in accordance with claim 28 wherein said step of receiving an offer to buy a selected product includes the step of receiving an offer to buy that includes a make and model of the product.

32. An exchange for facilitating online purchases and sales via a communications network, said exchange comprising:

a control unit for coupling to the communications network;

a server coupled to said control unit and comprising an offer to buy database for storing specific offers to buy, and an administration database for storing information related to seller accounts and buyer accounts, and a processor programmed to:

receive, over the network, offers to buy selected products, each offer to buy including a specific product configuration and an offer price, said processor further programmed to download said offers to buy into said offers to buy database, said control unit facilitating dynamic bidding by the potential buyers;

send, over the network, each offer to buy to a plurality of sellers; and receive, over the network, an acceptance from one of the sellers, the acceptance being responsive to the offer to buy, said processor further programmed to download, into said administration database, acceptance data upon acceptance of an offer to buy.

33. An exchange in accordance with claim 32 wherein said processor is further programmed to:

receive from each of the plurality of sellers an identification of a geographic region for the desired sale; and designate only offers to buy within the selected geographic region for being communicated to each seller.

34. An exchange in accordance with claim 32 wherein said processor is further programmed to send, over the network, the offer to buy to a plurality of sellers in a geographic region selected by the buyer.

35. An exchange in accordance with claim 32 wherein said processor is further programmed to generate an acceptance notification, including identification of the seller and the buyer, upon acceptance of an offer stored in said offer to buy database, said notification designated for communication.

36. An exchange in accordance with claim 32 wherein the electronic data communications network is a wide area network, said wide area network comprising the Internet.

37. An exchange in accordance with claim 32 wherein said processor is programmed to, upon the receipt of a predetermined command, designate a special request for offer from a buyer for communication to at least one seller.

38. An exchange in accordance with claim 32 wherein said processor further programmed to receive, over the network, an offer to buy a selected product, which offer to buy includes at least one option and style of the product.

39. An exchange in accordance with claim 32 wherein said processor further programmed to receive, over the network, an offer to buy a selected product, which offer to buy includes a make and model of the product.

40. An exchange for facilitating online purchases and sales via a communications network, said exchange comprising:
   a control unit for coupling to the communications network;
   a server coupled to said control unit and comprising an offer to sell database for storing specific offers to sell, an offer to buy database for storing specific offers to buy, an administration database for storing information related to seller accounts and buyer accounts, and a processor programmed to:
   receive offers to sell from potential sellers, said offers to sell defining actual offers to sell, said processor further programmed to download said offers to sell into said offer to sell database, said control unit facilitating dynamic bidding by the potential sellers to achieve a lowest price offer to sell;
   receive a buyer inquiry from a potential buyer, the buyer inquiry defining a desired purchase, upon receipt of the buyer inquiry, said processor programmed to compare offers stored in said offer to sell database with parameters of the buyer inquiry, and if one or more offers to sell are identified that match the buyer inquiry, designating only a lowest price identified offer to sell which matches the buyer inquiry for being communicated to the buyer;
   receive offers to buy from potential buyers, said offers to buy defining actual offers to buy, said processor further programmed to download said offers to buy into said offer to buy database, said control unit facilitating dynamic bidding by the potential buyers;
   receive a seller inquiry from a potential seller, said seller inquiry defining a desired sale, upon receipt of the seller inquiry, said processor programmed to compare offers to buy stored in said offer to buy database with parameters of said seller inquiry, and if one or more offers to buy are identified that match said seller inquiry, designating said offers to buy for being communicated to the seller;
   said processor further programmed to download, into said administration database, acceptance data upon acceptance of an offer stored in at least one of said databases.

41. An exchange in accordance with claim 40 wherein at least some of said offers comprise temporal and quantitative limitations.

42. An exchange in accordance with claim 40 wherein the inquiry comprises identification of a geographic region, and said processor is programmed to designate only an offer within said geographic region for communication.

43. An exchange in accordance with claim 40 wherein said processor is further programmed to generate an acceptance notification, including identification of the buyer and seller, upon acceptance of an offer stored in at least one of said databases, said notification designated for communication.

44. An exchange in accordance with claim 40 wherein the electronic data communications network is a wide area network.

45. An exchange in accordance with claim 40 wherein said processor is programmed to, upon the receipt of a predetermined command, designate a special request for offer from a buyer for communication to at least one seller.

46. A method for operating an exchange, the exchange being coupled to a communications network and including an offer to sell database for storing specific offers to sell, an offer to buy database for storing specific offers to buy, and an administration database for storing information related to seller accounts and buyer accounts, said method comprising the steps of:
   upon receipt of offers to sell from potential sellers, downloading the offers to sell into the offer to sell database, said control unit facilitating dynamic bidding by the potential sellers to achieve a lowest price offer to sell;
   upon receipt of a buyer inquiry from a potential buyer, comparing offers stored in the offer to sell database with parameters of the buyer inquiry, and if one or more offers to sell are identified that match said buyer inquiry, designating only a lowest price identified offer to sell which matches the buyer inquiry for being communicated to the buyer, thereby facilitating dynamic bidding;
   upon receipt of offers to buy from potential buyers, downloading said offers to buy into the offer to buy database, said control unit facilitating dynamic bidding by the potential buyers;
   upon receipt of a seller inquiry from a potential seller, comparing offers to buy stored in the offer to buy database with parameters of the seller inquiry, and if one or more offers to buy are identified that match the seller inquiry, designating the offers to buy for being communicated to the seller; and
   upon receipt of acceptance of an offer, downloading acceptance data into the administration database.

47. A method in accordance with claim 46 wherein the inquiry comprises identification of a geographic region, and wherein only offers within the geographic region are designated for being communicated.

48. A method in accordance with claim 46 wherein at least some of the offers comprise temporal and quantitative limitations.

49. A method in accordance with claim 46 further comprising the step of generating an acceptance notification, including identification of the buyer and seller, upon acceptance of an offer stored in at least one of the databases.

50. A method in accordance with claim 46 further comprising the step of upon the receipt of a predetermined command, designating a special request for offer from a buyer for communication to at least one seller.

51. An exchange for facilitating online purchases and sales via a communications network, said exchange comprising:
   a control unit for coupling to the communications network;
   a server coupled to said control unit and comprising an offer to sell database for storing specific offers to sell, and an administration database for storing information related to seller accounts and buyer accounts, and a processor programmed to:
   receive offers to sell from potential sellers, said offers to sell defining actual offers to sell, said processor further programmed to download said offers to sell into said offer to sell database, said control unit facilitating dynamic bidding by the potential sellers to achieve a lowest price offer to sell;

receive a buyer inquiry from a potential buyer, the buyer inquiry defining a desired purchase;

upon receipt of the buyer inquiry, said processor programmed to compare offers stored in said offer to sell database with parameters of the buyer inquiry, and if one or more offers to sell are identified that match the buyer inquiry, designating only a lowest price offer to sell which matches the buyer inquiry for being communicated to the buyer, thereby facilitating dynamic bidding;

said processor further programmed to download, into said administration database, acceptance data upon acceptance of an offer stored in said offer to sell database.

52. An exchange in accordance with claim 51 wherein the buyer inquiry comprises identification of a geographic region for the desired purchase, said processor programmed to designate only offers within said geographic region for being communicated to the buyer.

53. An exchange in accordance with claim 51 wherein said processor is further programmed to generate an acceptance notification, including identification of the seller and the buyer, upon acceptance of an offer stored in said offer to sell database, said notification designated for communication.

54. An exchange in accordance with claim 51 wherein the electronic data communications network is a wide area network.

55. An exchange for facilitating online purchases and sales via a communications network, said exchange comprising:

a control unit for coupling to the communications network;

a server coupled to said control unit and comprising an offer to sell database for storing specific offers to sell, and an administration database for storing information related to seller accounts and buyer accounts, and a processor programmed to:

upon receipt of a predetermined command, designate a special request that is received from a buyer for an offer to sell for communication to at least one seller;

receive offers to sell from potential sellers, said offers to sell defining actual offers to sell, said offers for sale initiated by said special request for offer, said processor further programmed to download said offers to sell into said offer to sell database, said control unit facilitating dynamic bidding by the potential sellers to achieve a lowest price offer to sell;

said processor further programmed to compare offers stored in said offer to sell database with parameters of the special request for offer, and if one or more offers to sell are identified that match the special request for offer, designating only a lowest price offer to sell which matches the buyer inquiry for being communicated to the buyer;

said processor further programmed to download, into said administration database, acceptance data upon acceptance of an offer stored in said offer to sell database.

56. An apparatus for facilitating a transaction over a network between at least one of a plurality of buyers and at least one of a plurality of sellers, comprising:

a storage device, and a processor connected to said storage device;

said storage device storing a program for controlling said processor, said processor operative with the program to:

receive, over the network, offers to sell from a plurality of sellers, which offers to sell include offer prices, said processor facilitating dynamic bidding by the sellers to achieve a lowest offer price which is lower than a currently valid offer price;

make the offer to sell having the lowest offer price available, over the network, to the buyer; and receive, over the network, an acceptance from the buyer, the acceptance being responsive to the offer to sell having the lowest offer price.

57. An apparatus in accordance with claim 56 wherein said processor is operative with the program to designate only offers within a selected geographic region for being communicated to the buyer.

58. An apparatus in accordance with claim 56 wherein said processor is operative with the program to generate an acceptance notification, including identification of the seller and the buyer, upon acceptance of an offer.

59. An apparatus in accordance with claim 56 wherein the network is a wide area network.

60. An apparatus for facilitating a transaction over a network between at least one of a plurality of buyers and at least one of a plurality of sellers, comprising:

a storage device, and a processor connected to said storage device;

said storage device storing a program for controlling said processor, said processor operative with the program to:

designate a special request for offer from a buyer for communication to at least one seller;

receive, over the network, offers to sell from a plurality of sellers, which offers to sell include offer prices, said processor facilitating dynamic bidding by the sellers to achieve a lowest offer price which is lower than a currently valid offer price;

make the offer to sell having the lowest offer price available, over the network, to the buyer; and receive, over the network, an acceptance from the buyer, the acceptance being responsive to the offer to sell having the lowest offer price.

61. An exchange for facilitating online purchases and sales via a communications network, said exchange comprising:

a control unit for coupling to the communications network;

a server coupled to said control unit and comprising an offer to buy database for storing specific offers to buy, an offer to sell database for storing offer inquiries, and an administration database for storing information related to seller accounts and buyer accounts, and a processor programmed to:

receive offers to buy from potential buyers, said offers to buy defining actual offers to buy, said processor further programmed to download said offers to buy into said offers to buy database, said server facilitating dynamic bidding by the potential buyers to achieve a highest price offer to buy;

receive a seller inquiry from a potential seller, said processor further programmed to download said seller inquiry into said offers to sell database, said seller inquiry defining a desired sale, said processor further programmed to compare offers to buy stored in said offer to buy database with parameters of said seller inquiry stored in said offer to sell database;

said processor further programmed to download, into said administration database, acceptance data upon acceptance of an offer to buy.

62. An exchange in accordance with claim 61 wherein the seller inquiry comprises identification of a geographic region for the desired sale, said processor programmed to designate only offers to buy within said geographic region for being communicated to the seller.

63. An exchange in accordance with claim 61 wherein said processor is further programmed to generate an acceptance notification, including identification of the seller and the buyer, upon acceptance of an offer stored in said offer to buy database, said notification designated for communication.

64. An exchange in accordance with claim 61 wherein the electronic data communications network is a wide area network, said wide area network comprising the Internet.

65. An exchange in accordance with claim 61 wherein said processor is programmed to, upon the receipt of a predetermined command, designate a special request for offer from a buyer for communication to at least one seller.

* * * * *

UNITED STATES PATENT AND TRADEMARK OFFICE
CERTIFICATE OF CORRECTION

| | | |
|---|---|---|
| PATENT NO. | : 7,133,835 B1 | Page 1 of 1 |
| APPLICATION NO. | : 08/550455 | |
| DATED | : November 7, 2006 | |
| INVENTOR(S) | : Fusz et al. | |

It is certified that error appears in the above-identified patent and that said Letters Patent is hereby corrected as shown below:

Column 10, line 57, delete "buyer" and insert therefor -- seller --.

Signed and Sealed this

Sixteenth Day of January, 2007

JON W. DUDAS
*Director of the United States Patent and Trademark Office*